(12) United States Patent
Ashraf et al.

(10) Patent No.: US 10,112,563 B2
(45) Date of Patent: Oct. 30, 2018

(54) TAPERED CRUSH CAN

(71) Applicant: Faraday&Future Inc., Gardena, CA (US)

(72) Inventors: Umran Ashraf, San Diego, CA (US); John Michael Colt, Redondo Beach, CA (US); Cory Denis Borghi, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 282 days.

(21) Appl. No.: 15/015,034

(22) Filed: Feb. 3, 2016

(65) Prior Publication Data

US 2017/0001586 A1    Jan. 5, 2017

Related U.S. Application Data

(63) Continuation-in-part of application No. 14/840,741, filed on Aug. 31, 2015.

(Continued)

(51) Int. Cl.
*B60N 99/00* (2006.01)
*B60R 19/34* (2006.01)
(Continued)

(52) U.S. Cl.
CPC .............. *B60R 19/34* (2013.01); *B60K 1/04* (2013.01); *B62D 21/152* (2013.01); *F16F 7/12* (2013.01);
(Continued)

(58) Field of Classification Search
CPC .. B60R 19/34; B60K 1/04; B60K 2001/0438; B62D 21/152; B62D 21/07;
(Continued)

(56) References Cited

U.S. PATENT DOCUMENTS 3,869,017 A    3/1975  Feustel et al.
4,173,264 A   11/1979  Erker et al.
(Continued)

FOREIGN PATENT DOCUMENTS

JP    2007-283868 A       11/2007
JP    2012166673 A    *   9/2012
(Continued)

OTHER PUBLICATIONS

First Action Interview Pilot Program Pre-Interview Communication dated Nov. 10, 2016, for U.S. Appl. No. 15/240,976, filed Aug. 18, 2016, seven pages.

(Continued)

*Primary Examiner* — Lori L Lyjak
(74) *Attorney, Agent, or Firm* — Morrison & Foerster LLP

(57) ABSTRACT

Crush cans for motor vehicles are provided herein. An example crush can includes a first open end, a second open end, and a longitudinal axis running from the first open end to the second open end. The crush can further includes a top wall, a bottom wall, a first side wall and a second side wall. The top wall and the bottom wall taper from the second open end towards the first open end. The crush can uniformly collapses when under compressive forces along the longitudinal axis.

20 Claims, 26 Drawing Sheets

Related U.S. Application Data

(60) Provisional application No. 62/187,044, filed on Jun. 30, 2015.

(51) Int. Cl.
| | | |
|---|---|---|
| *B60K 1/04* | (2006.01) | |
| *B62D 21/15* | (2006.01) | |
| *F16F 7/12* | (2006.01) | |
| *B62D 21/07* | (2006.01) | |
| *B62D 25/20* | (2006.01) | |
| *B62D 63/02* | (2006.01) | |

(52) U.S. Cl.
CPC ... *B60K 2001/0438* (2013.01); *B60Y 2306/01* (2013.01); *B62D 21/07* (2013.01); *B62D 25/2018* (2013.01); *B62D 25/2027* (2013.01); *B62D 25/2036* (2013.01); *B62D 63/025* (2013.01)

(58) Field of Classification Search
CPC ............ B62D 25/2018; B62D 25/2027; B62D 25/2036; B62D 63/025; F26F 7/12; B60Y 2306/01
See application file for complete search history.

(56) References Cited

U.S. PATENT DOCUMENTS

| | | | |
|---|---|---|---|
| 5,042,831 A | 8/1991 | Kuhns | |
| 5,476,151 A | 12/1995 | Tsuchida et al. | |
| 6,227,322 B1 | 5/2001 | Nishikawa | |
| 6,793,248 B1 | 9/2004 | Sung | |
| 6,843,524 B2 | 1/2005 | Kitagawa | |
| 7,258,392 B2 | 8/2007 | Frederick et al. | |
| 7,393,016 B2 | 7/2008 | Mitsui et al. | |
| 8,051,934 B2 | 11/2011 | Kiya et al. | |
| 8,424,960 B2 | 4/2013 | Rawlinson et al. | |
| 8,459,726 B2* | 6/2013 | Tyan ..................... | B60R 19/34 296/133 |
| 8,490,988 B2 | 7/2013 | Takeshita et al. | |
| 8,530,015 B2 | 9/2013 | Mendiboure et al. | |
| 8,657,060 B2 | 2/2014 | Ohno et al. | |
| 8,672,354 B2 | 3/2014 | Kim et al. | |
| 8,696,051 B2 | 4/2014 | Charbonneau et al. | |
| 8,789,634 B2 | 7/2014 | Nitawaki | |
| 8,807,632 B2 | 8/2014 | Ramoutar et al. | |
| 8,882,150 B2 | 11/2014 | Yamada et al. | |
| 9,067,550 B2* | 6/2015 | Nagwanshi ............ | B60R 19/34 |
| 9,073,578 B2 | 7/2015 | Chikazawa | |
| 9,096,275 B2 | 8/2015 | Yasui et al. | |
| 9,120,507 B1 | 9/2015 | Alwan et al. | |
| 9,168,883 B1* | 10/2015 | Midoun ................ | B62D 21/152 |
| 9,187,053 B2* | 11/2015 | Nusier .................. | B60R 19/34 |
| 9,187,136 B1 | 11/2015 | Leanza et al. | |
| 9,254,872 B2 | 2/2016 | Otani et al. | |
| 9,272,679 B1 | 3/2016 | Ramoutar et al. | |
| 9,346,424 B2* | 5/2016 | Alavandi .............. | B60R 19/04 |
| 2002/0057004 A1 | 5/2002 | Corcoran et al. | |
| 2006/0061081 A1 | 3/2006 | Kresse, Jr. et al. | |
| 2006/0103169 A1 | 5/2006 | Anders | |
| 2007/0215402 A1* | 9/2007 | Sasaki .................. | B62D 21/152 180/232 |
| 2009/0243336 A1* | 10/2009 | Honji ................... | B62D 21/152 296/187.09 |
| 2010/0147608 A1 | 6/2010 | Okabe | |
| 2011/0015902 A1* | 1/2011 | Cheng .................. | B62D 21/152 703/1 |
| 2011/0062750 A1* | 3/2011 | Nakaura ............... | B60K 11/08 296/187.09 |
| 2012/0169089 A1 | 7/2012 | Rawlinson et al. | |
| 2012/0175897 A1 | 7/2012 | Rawlinson et al. | |
| 2013/0069377 A1* | 3/2013 | Qu ......................... | B60R 19/34 293/133 |
| 2013/0088044 A1 | 4/2013 | Charbonneau et al. | |
| 2013/0200653 A1 | 8/2013 | Yasui et al. | |
| 2013/0241237 A1 | 9/2013 | Dziuba et al. | |
| 2014/0291053 A1 | 10/2014 | Nagasawa et al. | |
| 2014/0338999 A1 | 11/2014 | Fujii et al. | |
| 2015/0353040 A1* | 12/2015 | Butukuri ............... | B62D 21/155 293/102 |
| 2015/0375622 A1 | 12/2015 | Yamanaka | |
| 2016/0039467 A1 | 2/2016 | Takenaka | |
| 2016/0207418 A1 | 7/2016 | Bergstrom et al. | |
| 2017/0001507 A1 | 1/2017 | Ashraf et al. | |
| 2017/0001667 A1 | 1/2017 | Ashraf | |
| 2017/0025655 A1 | 1/2017 | Klimek et al. | |
| 2017/0120951 A1 | 5/2017 | Ashraf et al. | |

FOREIGN PATENT DOCUMENTS

| | | |
|---|---|---|
| JP | 2013117291 A * | 6/2013 |
| WO | WO-2012/117204 A1 | 9/2012 |
| WO | WO-2017/075523 A2 | 5/2017 |

OTHER PUBLICATIONS

International Search Report and Written Opinion dated Mar. 18, 2016, for PCT Application No. PCT/US2015/064506, filed Dec. 8, 2015, thirteen pages.

Final Office Action dated Aug. 25, 2017, for U.S. Appl. No. 14/840,741, filed Aug. 31, 2015, ten pages.

Final Office Action dated May 5, 2017, for U.S. Appl. No. 15/240,976, filed Aug. 18, 2016, eight pages.

International Search Report dated Apr. 24, 2017, for PCT Application No. PCT/US2016/059564, filed Oct. 28, 2016, eight pages.

International Search Report dated May 16, 2017, for PCT Application No. PCT/US2017/015857, filed Jan. 31, 2017, three pages.

First Action Interview Office Action Summary dated Feb. 6, 2017, for U.S. Appl. No. 15/240,976, filed Aug. 18, 2016, three pages.

Non-Final Office Action dated Feb. 9, 2017, for U.S. Appl. No. 14/840,741, filed Aug. 31, 2015, 13 pages.

Non-Final Office Action dated Mar. 16, 2018, for U.S. Appl. No. 15/240,976, filed Aug. 18, 2016, seven pages.

Final Office Action dated May 21, 2018, for U.S. Appl. No. 14/840,741, filed Aug. 31, 2015, eleven pages.

Non-Final Office Action dated Jun. 8, 2018, for U.S. Appl. No. 15/078,871, filed Mar. 23, 2016, eight pages.

Notice of Allowance dated Jul. 12, 2018, for U.S. Appl. No. 15/240,976, filed Aug. 18, 2016, five pages.

* cited by examiner

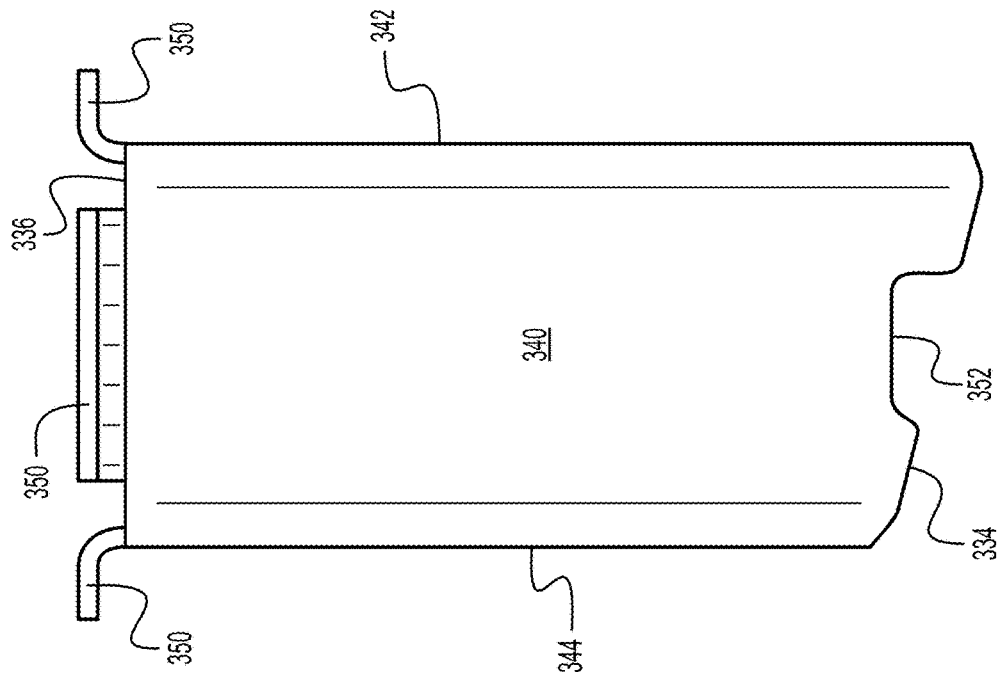
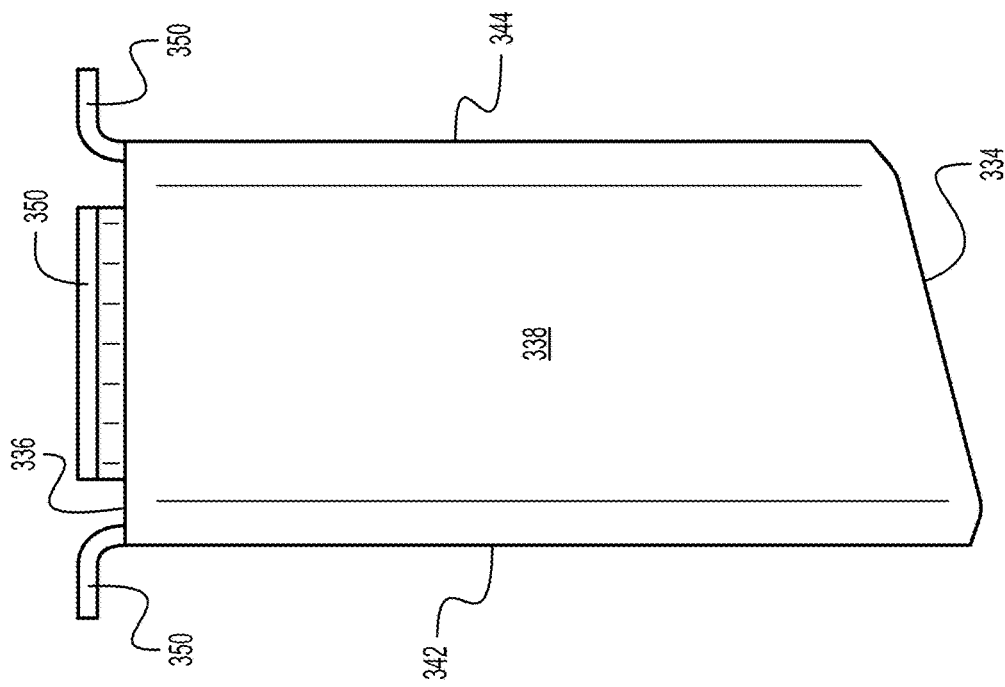

TAPERED CRUSH CAN

CROSS REFERENCE TO RELATED APPLICATIONS

This non-provisional patent application claims priority benefit of, and is a continuation-in-part of, U.S. patent application Ser. No. 14/840,741, filed on Aug. 31, 2015, entitled "Underbody for a Motor Vehicle," which claims the benefit of U.S. Provisional Application No. 62/187,044, filed Jun. 30, 2015, which are hereby incorporated by reference here in their entirety, including all references and appendices cited therein.

FIELD OF THE PRESENT DISCLOSURE

The present disclosure relates generally to an automobile frame and, more particularly, but not by way of limitation, to an underbody frame and design for electric and other motor vehicles.

SUMMARY

According to some embodiments, the present disclosure is directed to a crush can for a vehicle underbody comprising: (a) a first end and a second end; (b) a top wall and a bottom wall, the top wall and the bottom wall tapering from the second end towards the first end; and (c) a first side wall and a second side wall, the top wall, the bottom wall, the first side wall and the second side wall each having a flat surface.

According to some embodiments, the present disclosure is directed to a crush can for a vehicle comprising: (a) a body having a first open end, a second open end, an outer surface, and a longitudinal axis running from the first open end to the second open end; (b) a first state; and (c) a second state after the crush can uniformly collapses when under one or more compressive forces along the longitudinal axis greater than a predetermined threshold force.

According to some embodiments, the present disclosure is directed to a motor vehicle underbody, comprising: (a) a front bumper; (b) at least one frame rail; and (c) at least one crush can coupled to the front bumper and the at least one frame rail, the crush can comprising: (i) a first end, a second end, and a longitudinal axis running from the first end to the second end; (ii) a top wall and a bottom wall, the top wall and the bottom wall tapering from the second end towards the first end; and (iii) a first side wall and a second side wall, the top wall, the bottom wall, the first side wall and the second side wall each having a flat surface, wherein the crush can uniformly collapses when compressed by one or more forces along the longitudinal axis.

BRIEF DESCRIPTION OF THE DRAWINGS

Certain embodiments of the present disclosure are illustrated by the accompanying figures. It will be understood that the figures are not necessarily to scale and that details not necessary for an understanding of the technology, or that render other details difficult to perceive, may be omitted. It will be understood that the technology is not necessarily limited to the particular embodiments illustrated herein.

FIG. 21 is a top view of the tapered crush can.

FIG. 22 is a bottom view of the tapered crush can.

DETAILED DESCRIPTION

Figure 1:
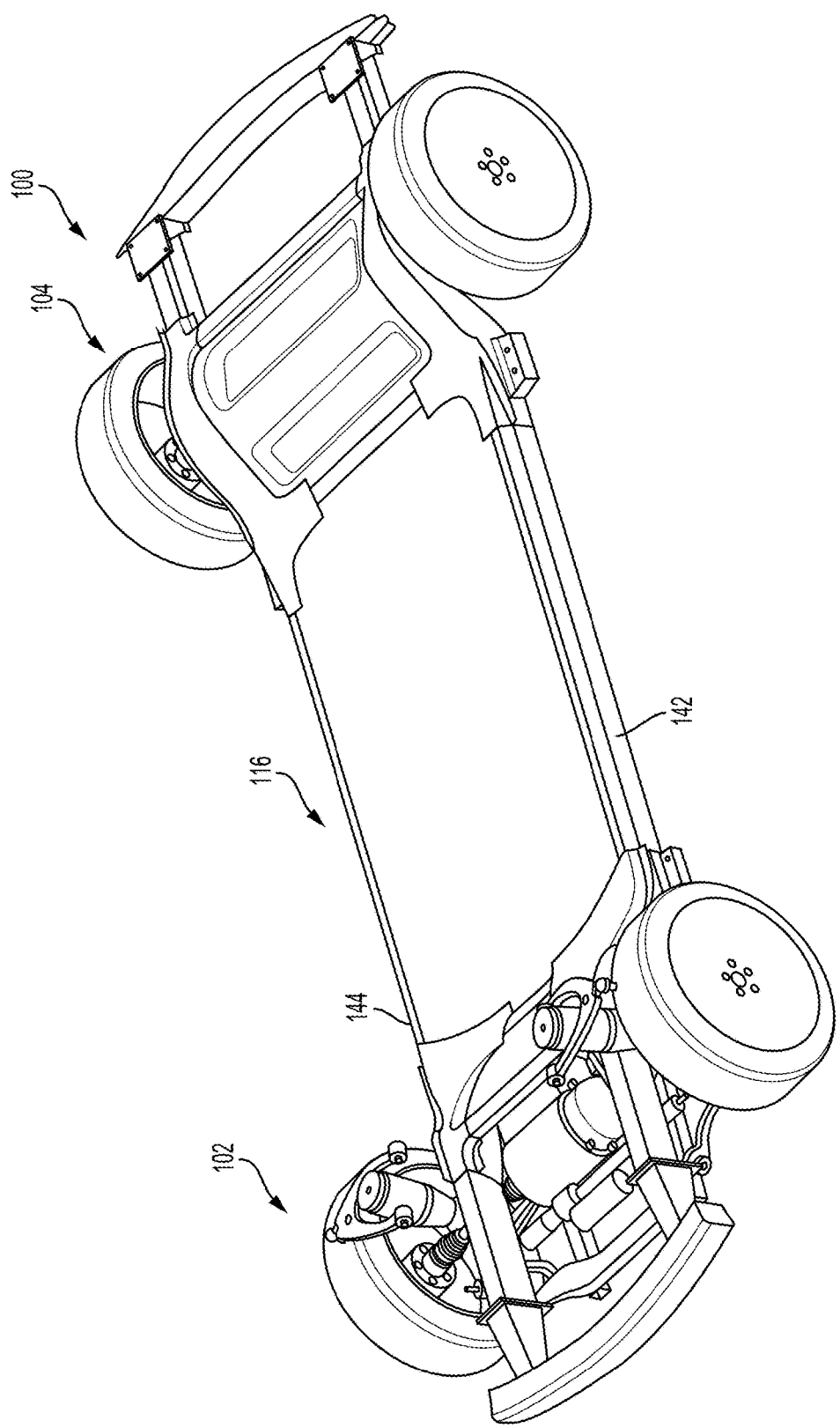
FIG. 1 is a perspective view of an underbody structure for the present disclosure according to an exemplary embodiment.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present disclosure. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The present disclosure provides exemplary underbody structures for motor vehicles. The underbody structure is also referred to as an underbody, a skateboard, or a chassis herein. In various embodiments, the underbody can form a hybrid uni-body with the upper body of the motor vehicle. Exemplary underbodies can provide an adaptable platform for accommodating different motor vehicle sizes and different vehicle upperbodies. The underbody of the present disclosure can enhance overall vehicle safety, for example, by having the battery pack centralized in the vehicle in various embodiments, resulting in greater crumple zone performance around the battery pack compared to existing vehicle designs. In addition, various embodiments of the underbody can, for example, provide for scalability to readily adapt to new vehicle platforms and provide for improved vehicle handling (yaw acceleration).

Provided are various embodiments of an underbody for a motor vehicle. The motor vehicle can be an electric vehicle, however, the present disclosure is not limited to use in electric vehicles. In various embodiments, the underbody can be configured to form a hybrid uni-body with the upper body and/or configured for use in multiple vehicle product lines, accommodating vehicles of various sizes having various upper bodies.

In some embodiments, a length of the adaptable platform can vary by increasing or reducing the length of certain structures between the front rails and the rear rails of the underbody.

In some embodiments, the width of the adaptable platform can vary by increasing or reducing the width of certain structures between the left side and right side that meets with an upper body of the vehicle.

The size of the battery can be selectively modifiable by virtue of a modular battery design.

The underbody can enhance overall vehicle safety, for example, due to having the battery being centralized in the vehicle, allowing for greater crumple zones around the battery compared to existing vehicle designs.

An upper portion (e.g., cover) of the battery enclosure can form all or part of a floor portion (assembly) of a passenger compartment of the motor vehicle. In some embodiments, the floor portion can be separate from the upper portion. An exemplary floor portion can extend longitudinally between a front section and a rear section of the battery cover. In some embodiments, an additional plate or panel can be included in the underbody that can separately, or together with the upper portion, form the floor portion of the passenger compartment. Additional cross members may be included to provide additional structural support.

Since the underbody according to various embodiments can function as the floor portion of the passenger compartment, the passenger compartment is not required to be completely separated from the underbody.

Other example embodiments of the disclosure and aspects will become apparent from the following description taken in conjunction with the following drawings.

Figure 2:
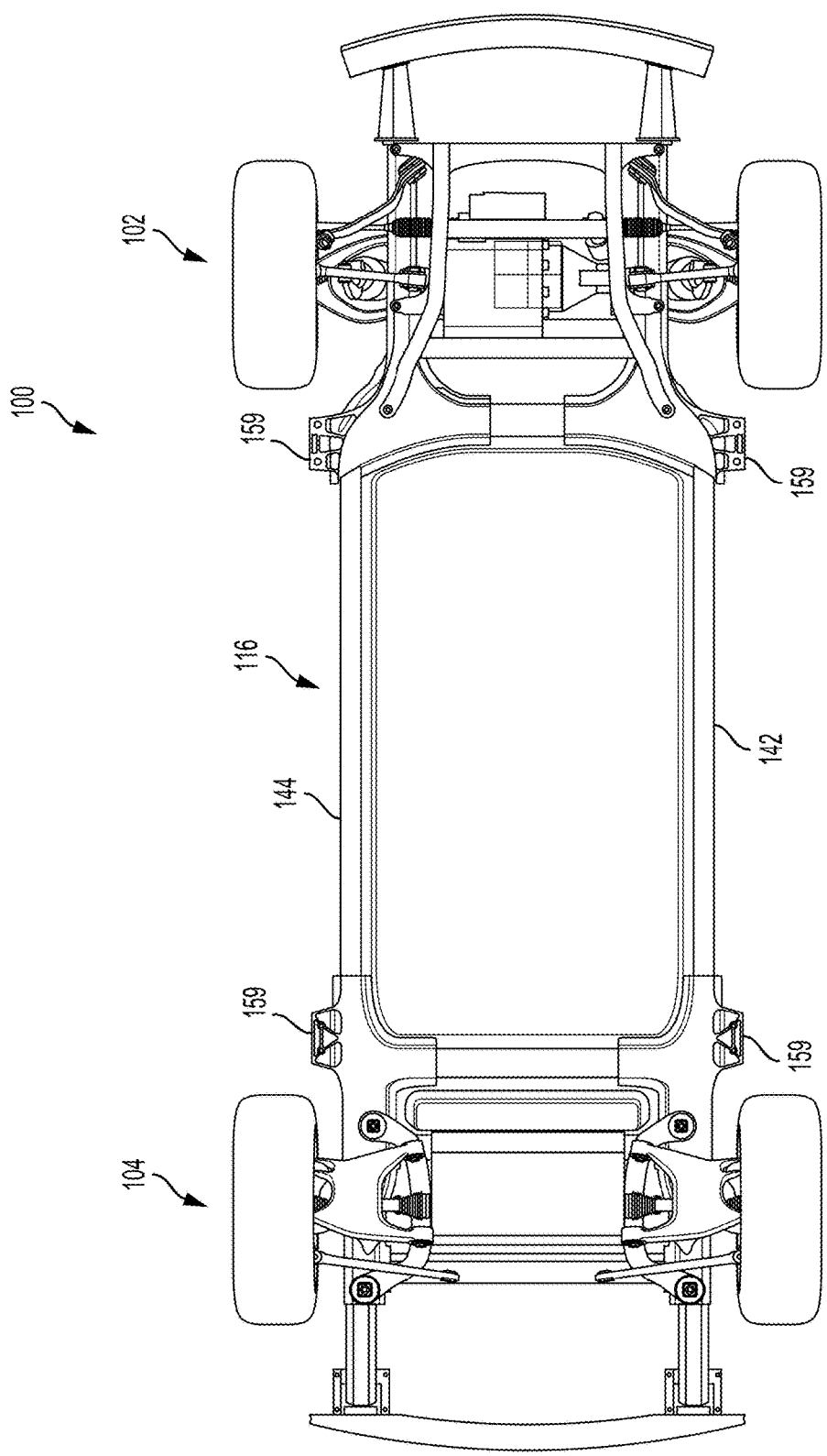
FIG. 2 is a top plan view of the underbody structure of FIG. 1.

FIGS. 1 and 2, collectively illustrate an example underbody 100. FIG. 1 is a perspective view of the example underbody 100 that is constructed in accordance with the present disclosure. Generally, the underbody can include a front end 102, a rear end 104, a battery sub-assembly 106 (see FIG. 3), as well as other additional or fewer components as will be described in greater detail herein.

The front end 102 and rear end 104 can be spaced apart from one another by a middle section 116. The middle section 116 can include a left center frame section 142 and a right center frame section 144.

The underbody 100, in some embodiments, can be constructed from various materials or a single material. The material(s) utilized in the underbody 100 will be described with reference to each of the components or sub-assemblies of the underbody 100.

In general, the underbody 100 can be configured to cooperate with an upper body, as will be described in greater detail below. A common design for vehicles involves the use of body-on-frame technology, where a frame is coupled with the engine, drivetrain, portions of the vehicle's suspension system, and wheels of the vehicle. The remaining portions of the vehicle, referred to as the upper body, are joined to the frame. Safety, comfort, and aesthetic components of the vehicle are found in the upper body, such as seats. Having the seats mounted to the frame can increase the safety of the vehicle by providing the seats with a more substantial and connected relationship with the underbody of the vehicle. Indirect mechanical connections between the seat, the body, and ultimately the frame serve to reduce these features.

Also, in a traditional body-on-frame vehicle, the frame comprises a skeleton of tubular frame members, where the drivetrain (e.g., drive shaft) traverses/extends the length of the frame, which necessitates having a frame that is typically divided into a right handed section and a left handed section. These sections are then joined through the use of cross members.

Advantageously, the present disclosure provides an underbody with a middle portion 116 that can be continuous from a right hand side of a frame to a left hand side of the frame, which can increase a resistance of the underbody to twisting during impact.

Thus, the underbody designs of the present disclosure can benefit from the strength and stability of the monocoque (i.e., vehicle structure in which the chassis is integral with the body) design, but provide greater flexibility by allowing various body components to be placed onto the underbody, such as the outer panels of the upper body.

Figure 3:
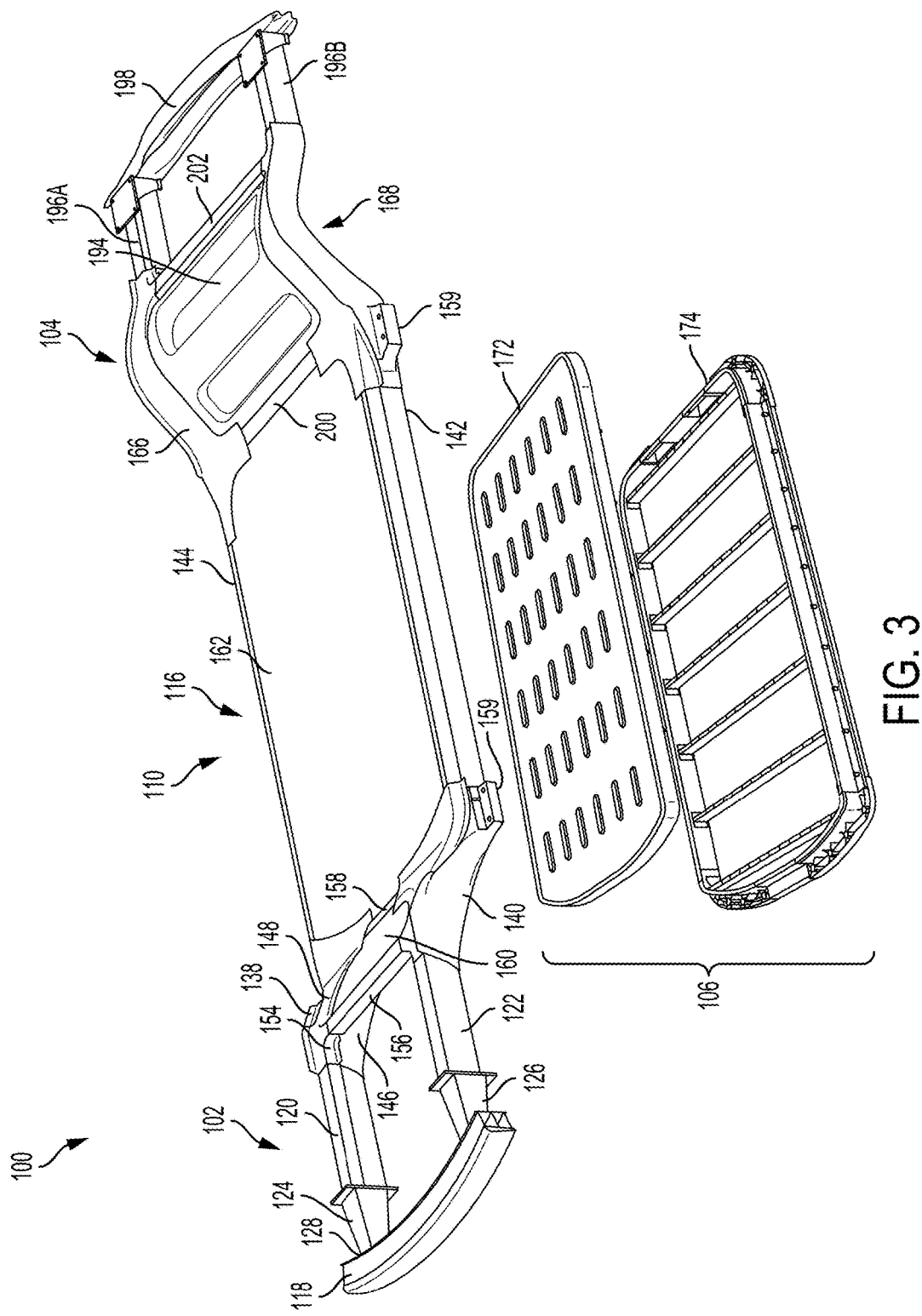
FIG. 3 is an exploded perspective view of the underbody structure, in combination with a battery sub-assembly.
Figure 9A:
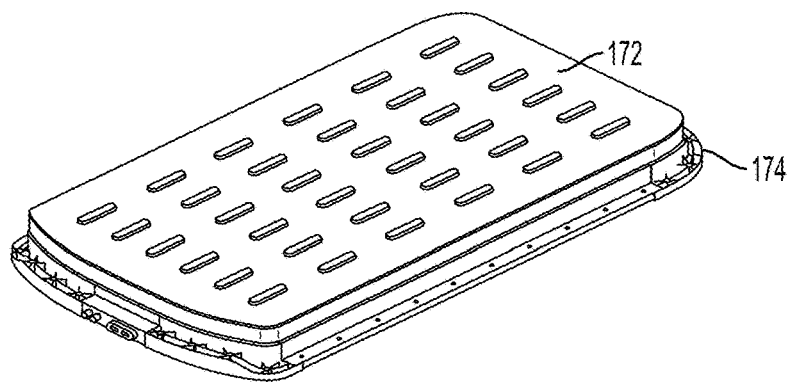
FIG. 9A is a perspective view of an exemplary battery sub-assembly.
Figure 9B:
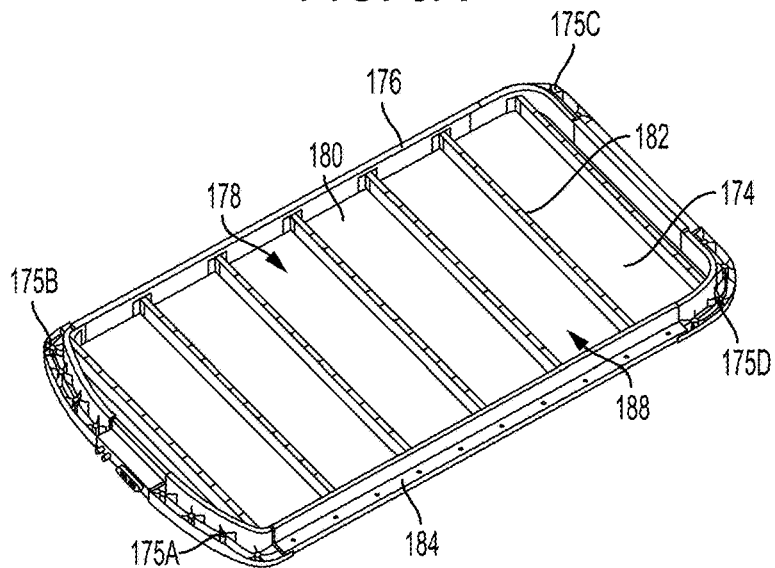
FIG. 9B is a perspective view of a body of the exemplary battery sub-assembly.
Figure 9C:
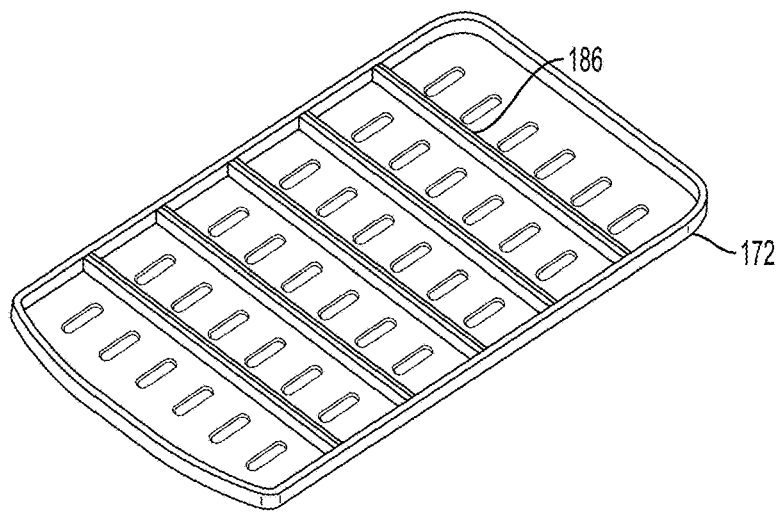
FIG. 9C is a perspective view of a cover of the exemplary battery sub-assembly.
Figure 10:
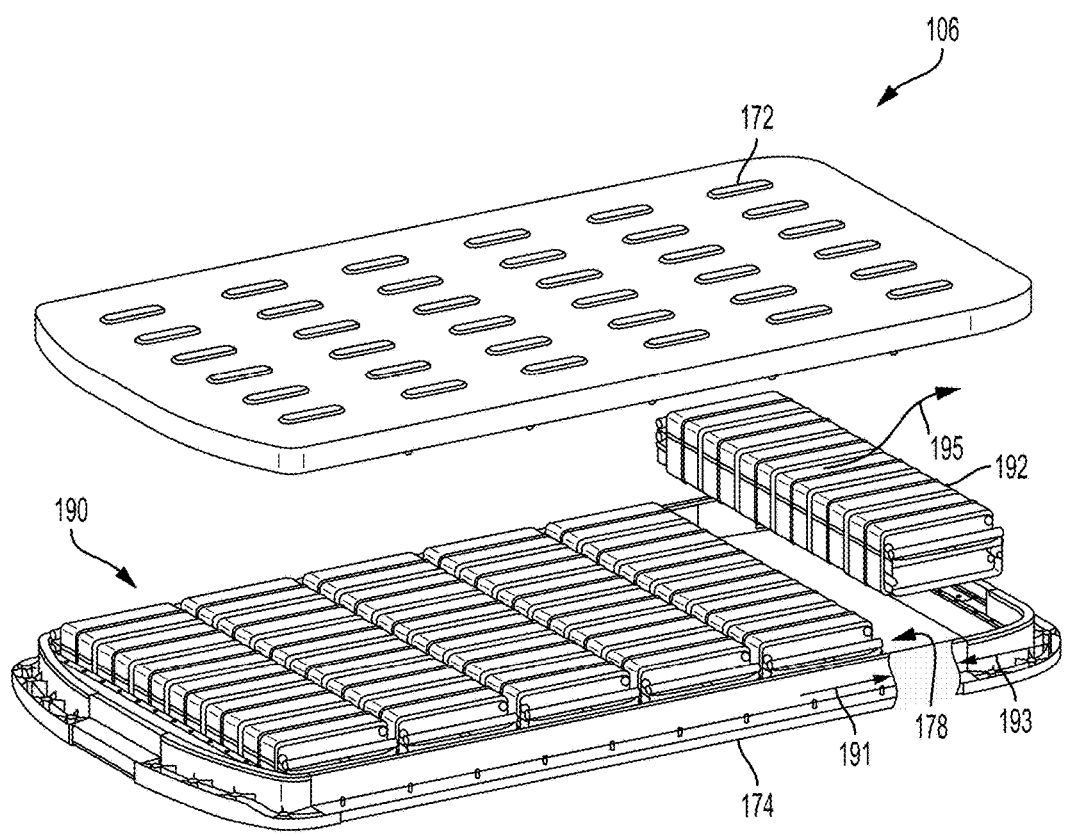
FIG. 10 is an exploded perspective view of the exemplary battery sub-assembly.

FIG. 3 is an exploded view of the underbody 100 that includes an outer peripheral frame 110 that illustrates a battery cover 172 and a body 174 (see FIGS. 9A-C) that holds the battery pack (see 190 in FIG. 10).

Figure 4:
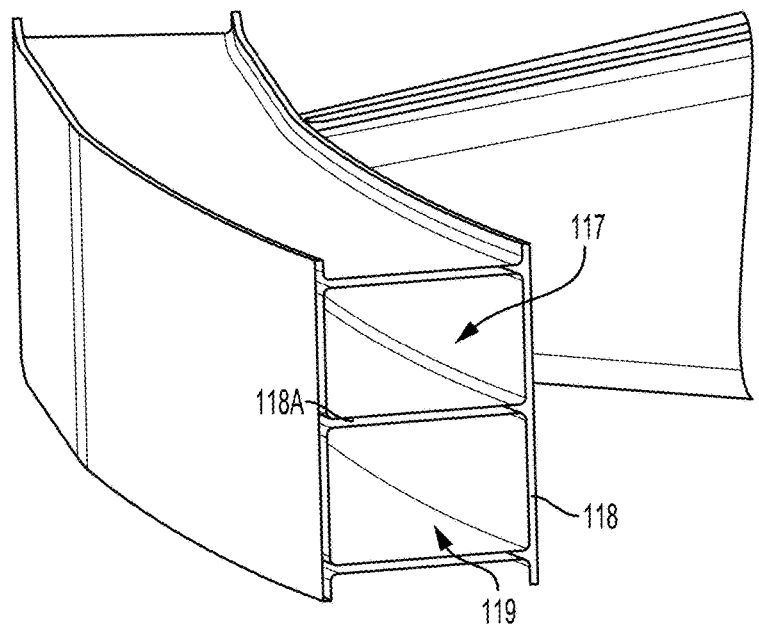
FIG. 4 is a cross sectional view of a front bumper of the underbody structure.

Turning now to FIGS. 3-6 collectively, described from front end 102 to rear end 104, the underbody 100 can comprise a front bumper 118. The front bumper 118 can be constructed from a cold rolled metal such as aluminum. As illustrated in FIG. 4, the front bumper 118 can comprise a divider web 118A that separates the front bumper into two sections, an upper section 117 and a lower section 119. The front bumper 118 can have a substantially tubular cross sectional area. In one embodiment, the front bumper 118 can have a substantially arcuate shape.

The front bumper 118 can be coupled with a pair of rails, such as first rail 120 and second rail 122. Connecting the front bumper 118 with the pair of rails can be the first crush can 124 and the second crush can 126.

Each of the rail crush cans 124 and 126 can be constructed similarly to one another and can be constructed from a sheet metal such as aluminum. In some embodiments, the crush cans 124, 126 can be made by casting or hydroforming. In one embodiment the first rail crush can 124 can have a substantially conical shape with flat outer face panel sections. Terminating one end of the first rail crush can 124 can be a mounting plate 128 that has an arcuate shape that conforms to an arcuate curvature of the front bumper 118. Again, the second rail crush can 126 can be constructed to form a complimentary mount for the second rail 122. It should be understood that other suitable mechanisms for coupling the front bumper 118 with the rails 120, 122 can also be adopted in other embodiments. The crush cans 124, 126 will be described in greater detail below and in FIGS. 14-23.

Figure 5:
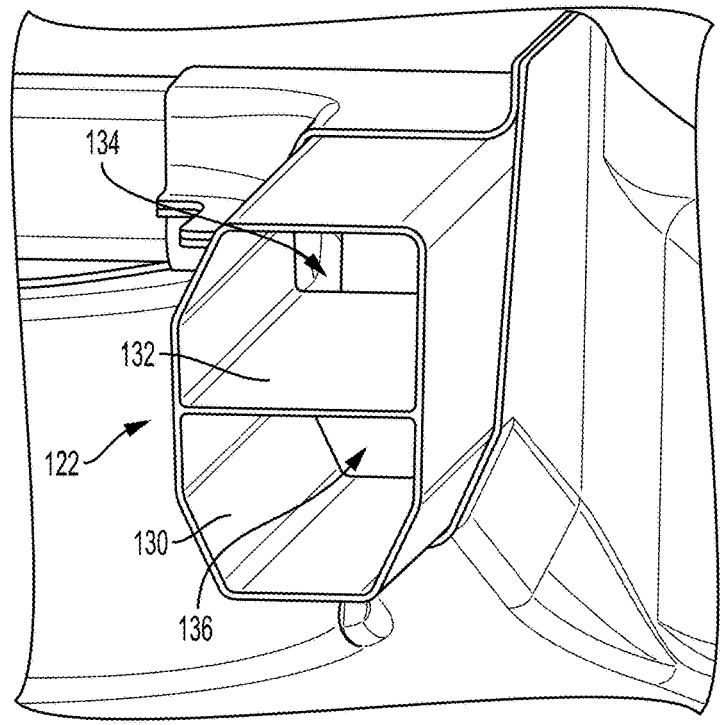
FIG. 5 is a cross sectional view of a front end rail of the underbody structure.

The first rail 120 and second rail 122 can be constructed similarly (e.g., as mirror images of each other) to one another and thus the second rail 122 will be described in greater detail with reference to FIG. 5. The second rail 122 can be a substantially tubular length of an extruded metal such as aluminum. The second rail can have various angled surfaces, such as angled surface 130, which can be altered according to design requirements such as desired crumple strength and motor sizing, for example. The second rail 122 can have a divider web 132 that provides structural support and divides the second rail 122 into an upper section 134 and lower section 136.

The underbody 100 can comprise frame transition sections, such as first transition section 138 and second transition section 140. The first and second transition sections 138 and 140 can be complementary (e.g., right handed, left handed) components. The first and second transition sections 138 and 140 can provide a narrowing connection between the left center frame section 142 and the right center frame section 144 (also illustrated in FIGS. 1 and 2).

For brevity and clarity, only the first transition section 138 will be described in detail. The first transition section 138 can comprise a lower segment 146 and an upper segment 148. The lower segment 146 can be manufactured from a high pressure die cast metal, such as aluminum. The lower segment 146 can be a high strength component that provides a compression point upon which the first and second rails 120 and 122 can crumple against.

Figure 6:
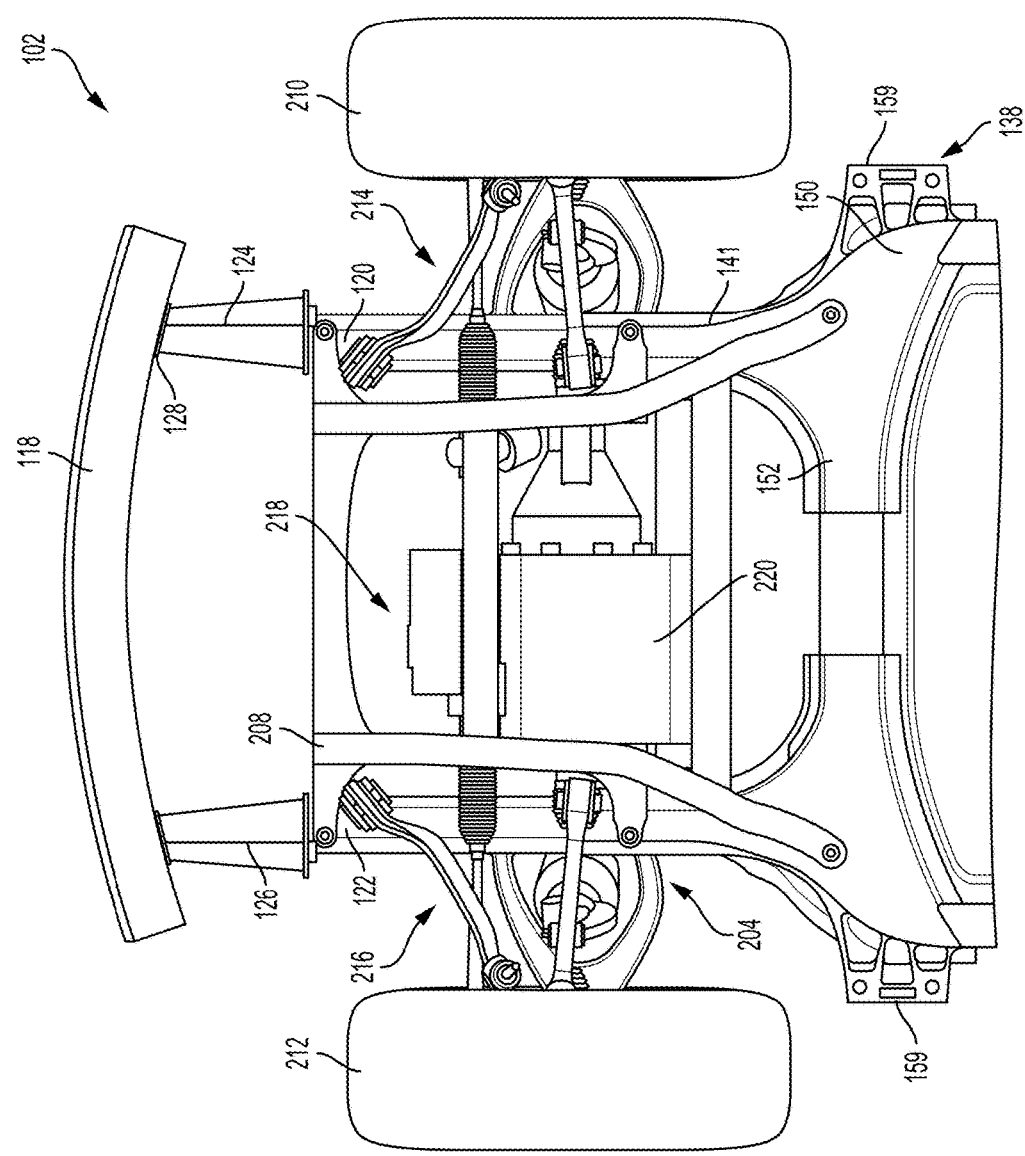
FIG. 6 is a bottom view of a front end of the underbody structure.

As illustrated in FIG. 6, the first transition section 138 can have a substantially T-shaped configuration with a rail coupling portion 141 and a frame section coupling portion 150. A transition tie section 152 can provide a mounting position for a front cross member, which is described below. Again, the second transition section 140 can have a similar, but complementary shape to first transition section 138.

In FIG. 3, the upper segment 148 of the first transition section 138 can cooperate with the lower segment 146 and include an opening 154 that receives a first front cross member 156 that ties the first transition section 138 and the second transition section 140 together, providing structural rigidity and stability to the underbody 100. The transition sections of the underbody 100 may be referred to as frame nodes. These frame nodes can provide structural rigidity and anchoring for the rails of the underbody.

A second front cross member 158 can extend between the first transition section 138 and the second transition section 140 for additional structural support. The upper segment 148 can include one or more sections and be configured to receive a front panel 160 that extends between the first transition section 138 and the second transition section 140 and the first and second front cross members 156 and 158. The front panel 160 can be manufactured from structurally rigid foam such as aluminum foam sandwich material.

The left center frame section 142 and the right center frame section 144 can extend between the front end 102 and the rear end 104. Extending between the left center frame section 142 and the right center frame section 144 can be a middle panel 162. The middle panel 162 may be manufactured from a structurally rigid foam such as aluminum foam sandwich material. The vehicle's passenger compartment is not required to be completely separated from the underbody according to various embodiments. For instance, the cover 172 of the battery sub-assembly 106 may be the middle panel 162, such that the cover 172 can form a floor section extending longitudinally along the middle section 116. In other embodiments, the cover 172 of the battery sub-assembly 106 can be coupled, from below, to a separate middle panel 162, the combination forming a floor section of the vehicle.

Figure 7:
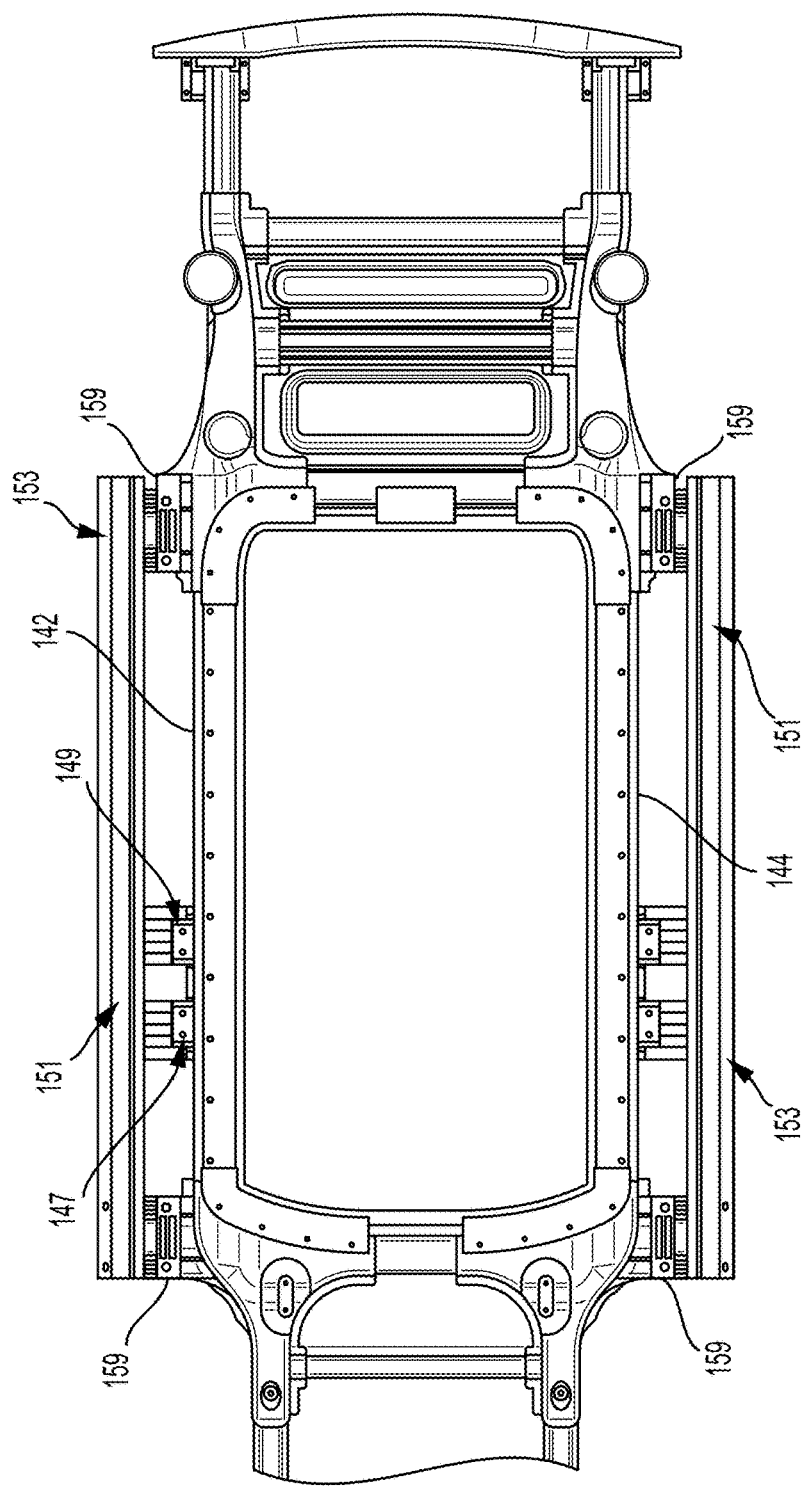
FIG. 7 is a bottom view of the underbody structure illustrating mounting rails of an exemplary upper body attached.
Figure 13:
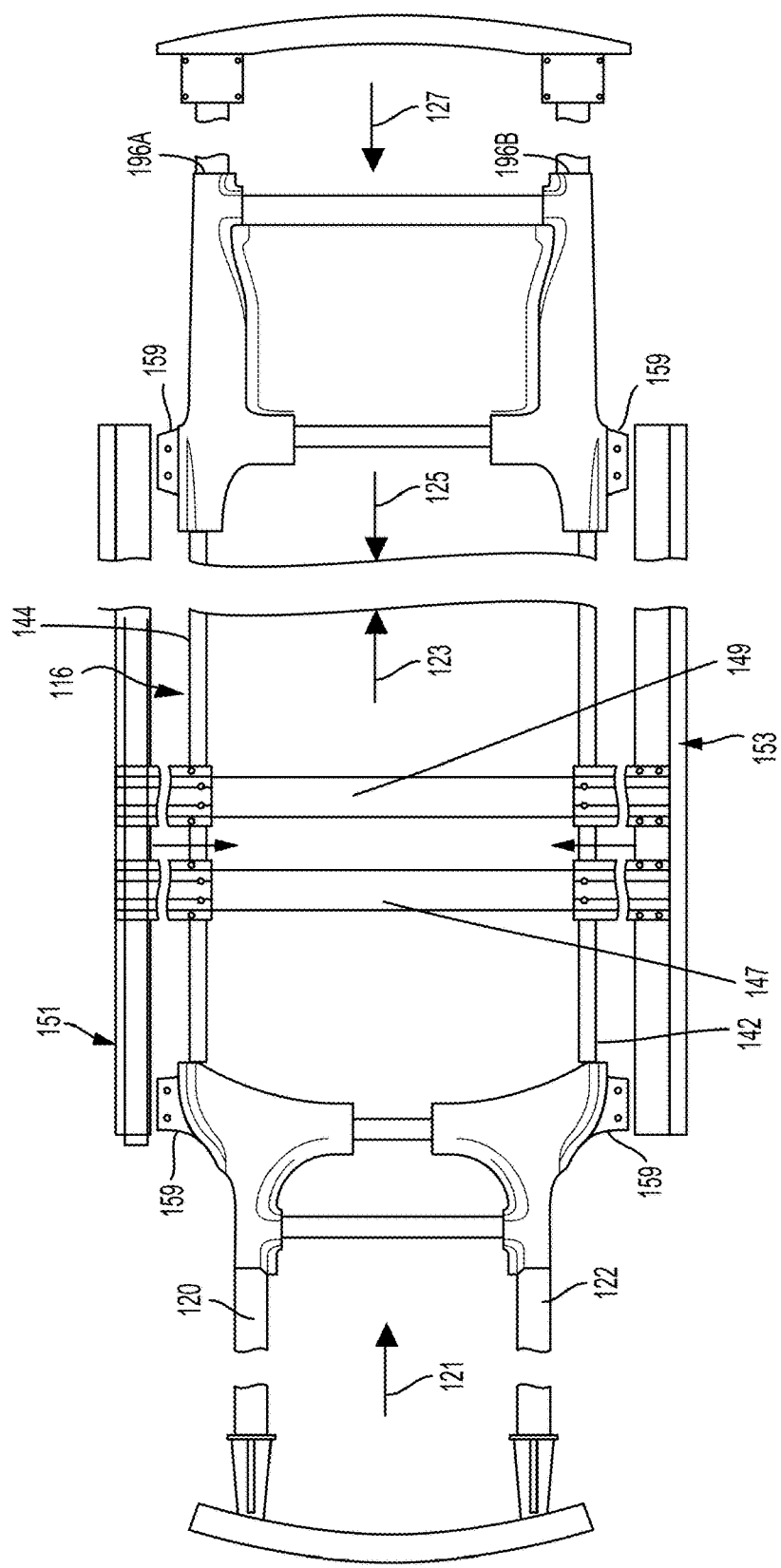
FIG. 13 is a top view of the exemplary underbody structure that illustrates various size configurable portions of the underbody structure that allow the underbody structure to be configured to accommodate various sizes of upper bodies of motor vehicles (with mounting rails of an exemplary upper body, that would attach to the underbody structure, also shown in this example).

The underbody 100 can also comprise one or more support members, such as middle support members 147 and 149 (see FIG. 13). These middle support members 147 and 149 may extend between the left center frame section 142 and the right center frame section 144 and provide yet additional structural rigidity to the underbody 100. Each of the members can comprise mounting brackets that join the member to the upper body sills 153. As illustrated in FIG. 7, in some embodiments, each of the mounting brackets can comprise joints 159 that couple the middle support members 147 and 149 with upper body rails, which are described in greater detail below.

Various embodiments can provide structural stability to the underbody 100 reducing frame twisting and bending, which can occur during impact events. For example, if the underbody 100 is impacted at a the rear right corner, the impact force can apply a twisting or torque force onto the underbody as the wheels on the front end 102 tend to remain in contact with the road.

Referring again to FIG. 3, disposed along the left center frame section 142 and the right center frame section 144 can be a plurality of joints 159 that allow any upper body to be coupled with the underbody 100. Examples of the joints 159, for anchoring the upper body (not shown) to the underbody 100, are also shown in FIG. 7.

Figure 8A:
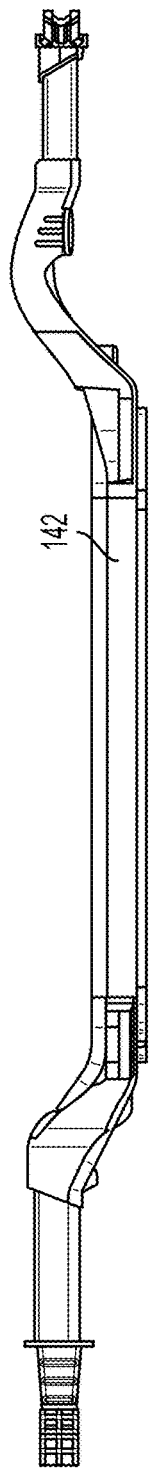
FIG. 8A is a side view of the underbody structure.
Figure 8B:
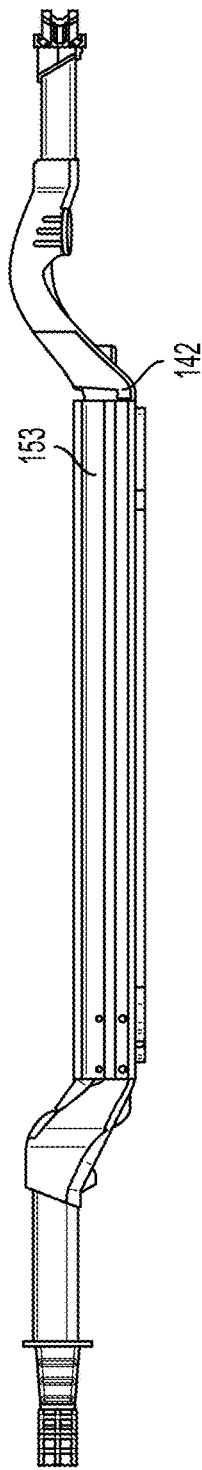
FIG. 8B is a side view of the underbody structure with exemplary upper body mounting rails attached.

In FIGS. 8A and 8B, upper body sills, such as upper body sill 153, can be joined to the left center frame section 142 and the right center frame section 144 (sections 142 illustrated in FIG. 3). For example, upper body sill 153 can be joined to right center frame section 144. The upper body sill 153 can couple the upper body (not shown) to the underbody 100 in some embodiments.

Referring back to FIG. 3, the first transition section 138 and the second transition section 140 can cooperate with the left center frame section 142 and the right center frame section 144, as well as a third transition section (node) 166 and a fourth transition section (node) 168 of the rear end 104 to form a sidewall creating a cavity for receiving a portion of the battery sub-assembly 106 therein.

An example battery sub-assembly 106 is illustrated in FIGS. 9A-C. An assembled version of the battery sub-assembly 106 is provided in FIG. 9A. A cover 172 is illustrated in combination with a body 174.

FIG. 9B illustrates the exemplary battery sub-assembly 106 with the cover 172 removed. The body 174 can be defined by a sidewall 176 that forms a cavity 178 with a lower portion 180 of the body 174. The sidewall 176 can include corner braces 175A-D, which can be manufactured using a casting process, whereas the remainder of the sidewall 176 can be manufactured from extruded metal sections.

Extending between left and right sections of the sidewall 176 can be support ribs, such as support rib 182. The support ribs can lie transversely across the lower portion 180. In some embodiments, the body 174 can be provided with a flange or step 184 that allows the battery sub-assembly 106 to be coupled with the outer peripheral frame (see for example FIGS. 3 and 7). Thus, the battery sub-assembly 106 can be installed into the opening of the outer peripheral frame (see for example FIGS. 3 and 7).

The cover 172 of the battery sub-assembly 106 can also be provided with support ribs such as support rib 186. These support ribs 186 can form seals sealing the individual battery strings from each other when positioned against the support ribs 182 of the lower portion 180 of the body 174. Optionally, the support ribs can also provide structural support to the cover 172.

In some embodiments, the support ribs 182 of the body 174 and the support ribs 186 of the cover 172 can cooperate to form battery channels, such as battery channel 188. The battery channel 188 can be configured to receive a battery cell stack which may be a stack or string of individual battery modules, as will be described in greater detail below.

Turning now to FIG. 10, a battery pack 190 can include an array of battery strings or segments, such as battery cell stack 192 (also referred to as battery cell string or battery string). The battery cell stack can include a string of battery modules (see exemplary module in FIG. 11).

It will be understood that the size of the battery pack 190 can be selectively controlled by removing or adding battery segments. As the size of the battery 190 changes, the configuration of the underbody 100 can change. For example, the lengths of the left center frame section 142 and the right center frame section 144 can be lengthened or shortened according to design requirements. The arrow 195 illustrated in the example in FIG. 10 references the removal of a battery cell stack 192 to compress the size of the battery pack 190. Arrows 191 and 193 reference the removal of a battery channel 178 to compress the size of the body of the battery sub-assembly accordingly.

Figure 11:
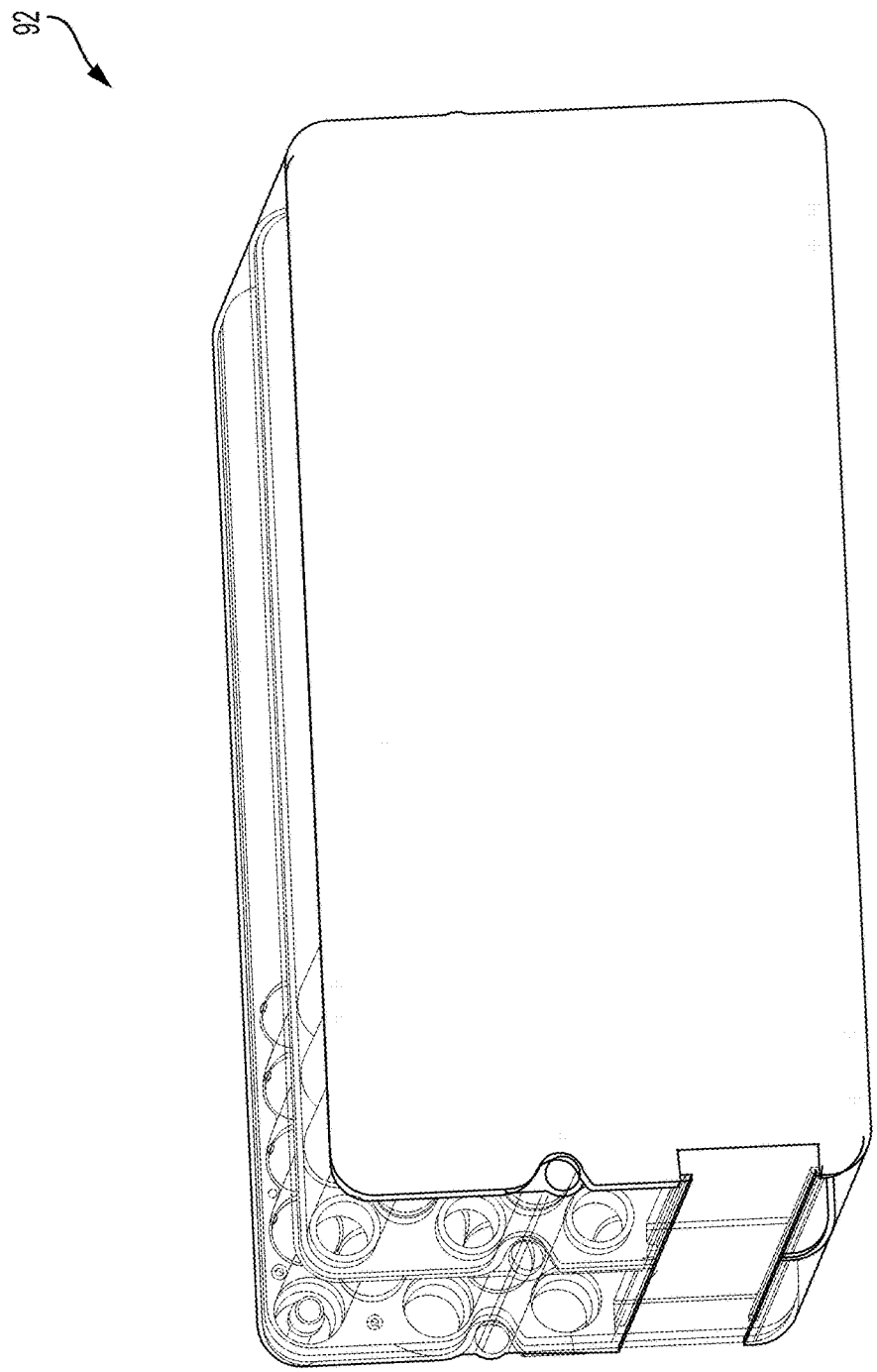
FIG. 11 is a perspective view of a portion of an exemplary battery module.

FIG. 11 illustrates a module 92 of the exemplary battery cell stack 192 (see FIG. 10).

Figure 12:
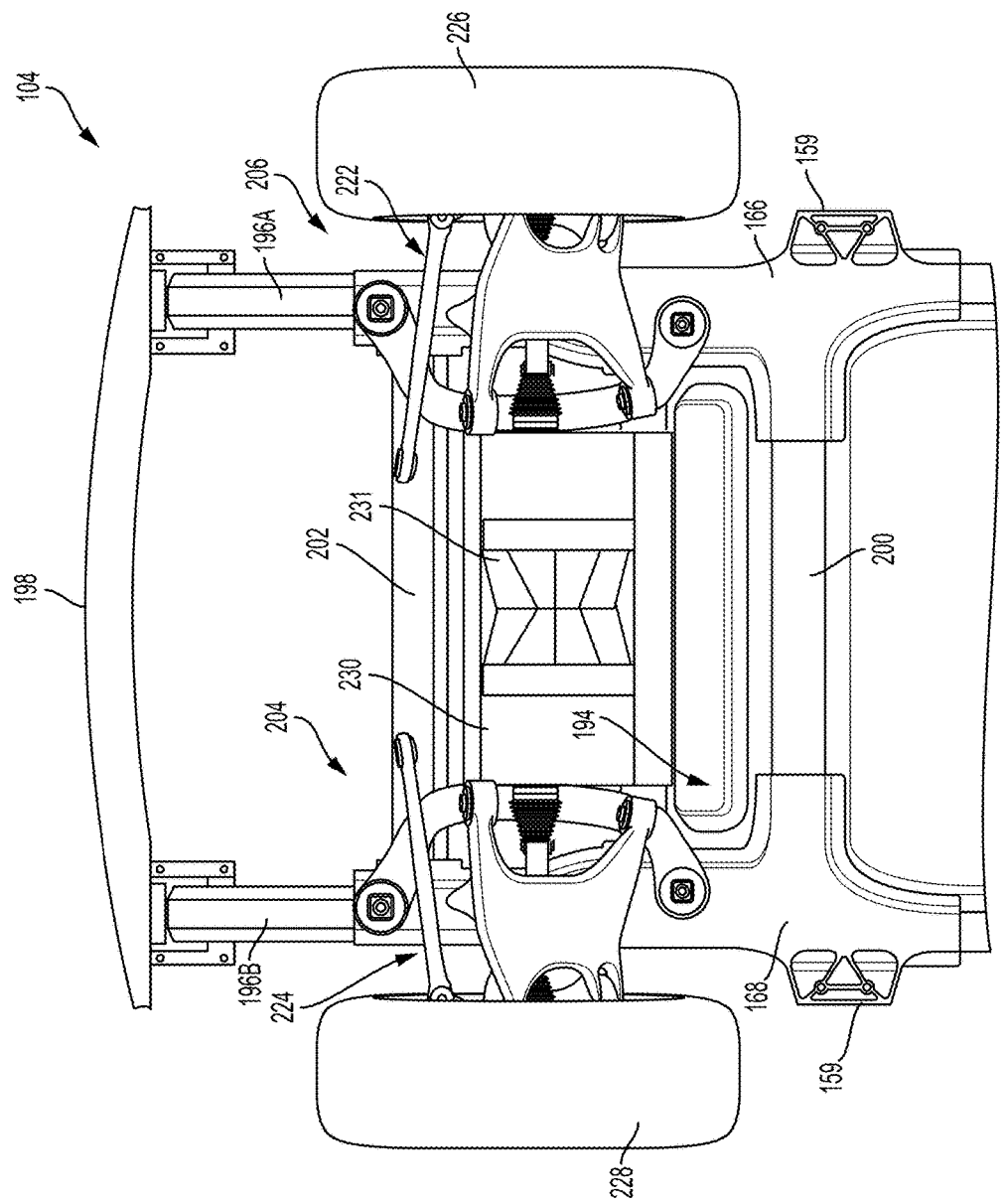
FIG. 12 is a bottom view of a rear end of the exemplary underbody structure.

Referring now to FIGS. 3 and 12 collectively, the rear end 104 of the underbody 100 is illustrated as comprising a rear structural panel 194, the third transition section 166, the fourth transition section 168, as well as a pair of rear bumper rails 196A and 196B, and a rear bumper 198.

The rear structural panel 194 can be manufactured from an aluminum foam sandwich material or a rolled panel of metal. The rear structural panel 194 can be bounded by the third transition section 166 and the fourth transition section 168, as well as a first rear cross member 200 and a second rear cross member 202. FIG. 12 illustrates an upward view of the bottom of the rear end 104, which illustrates the rear structural panel 194, which can be configured to accommodate a rear drive assembly 204. Additional details regarding rear and front drive assemblies 204 and 206 will be described with reference to FIGS. 6 and 12 in greater detail below.

The rear bumper rails 196A and 196B can be constructed similarly to the first and second rails 120 and 122 of the front end 102 and cooperatively engage the rear bumper 198. The rear bumper 198 can comprise an arcuate configuration and can be tubular in its cross section, similarly to the front bumper 118 of the front end 102.

FIG. 13 is a top plan view illustrating various features of an exemplary adaptable platform that includes an exemplary underbody structure that can be selectively adjusted in size to accommodate upper bodies of differing sizes. In addition to showing an exemplary underbody, FIG. 13 also shows sills 151 and 153 which are part of an exemplary upper body. The adaptable platform can provide adaptability of the underbody for use in the assembly of multiple vehicle product lines. The adaptable platform (also referred as a "skateboard" platform) may accommodate vehicles of various sizes having various upper bodies. The length of the adaptable platform can vary by increasing or reducing the length of certain structures between the front rail and the rear rail, as illustrated by arrows 121, 123, 125, and 127 in the example in FIG. 13. For example, the first and second rails 120 and 122 can be selectively lengthened or shortened, as well as the rear bumper rails 196A and 196B. The size of the middle section 116 of the underbody 100 can be shortened or lengthened as needed. In some embodiments, the width of the adaptable platform can vary by increasing or reducing the width of certain structures. The size of the battery sub-assembly 106 may be changed, along with other underbody structures for accommodating different motor vehicle sizes and different vehicle upper bodies. The change in size to the battery sub-assembly 106 may require removing or adding one or more battery channels, such as battery channel 188 of FIGS. 9A-C, and corresponding change in the configuration of the battery pack. To be sure, these components can be sized independently from one another depending on design requirements.

Turning back to FIG. 6, the front end 102 can be configured to receive the front drive assembly, which in some embodiments can include a subframe 208 that can be mechanically coupled to the first and second rails 120 and 122, as well as the first and second transition sections 138 and 140, respectively. Wheels 210 and 212 can be supported on the front end 102 with a suspension assembly that comprises suspension sub-assembly 214 and 216, which couple wheels 210 and 212, respectively to the underbody 100. In the example in FIG. 6, the wheels 210 and 212 of the vehicle can be coupled to a front power plant 218 that can comprise an electric motor 220.

FIG. 12 illustrates the rear drive assembly 204 comprising a rear suspension assembly having rear suspension sub-assemblies 222 and 224, which are coupled to the wheels 226 and 228, respectively, with the underbody 100. The rear drive assembly 204 can comprise a rear power plant 230, which can also comprise one or more electric motors 231.

Figure 14:
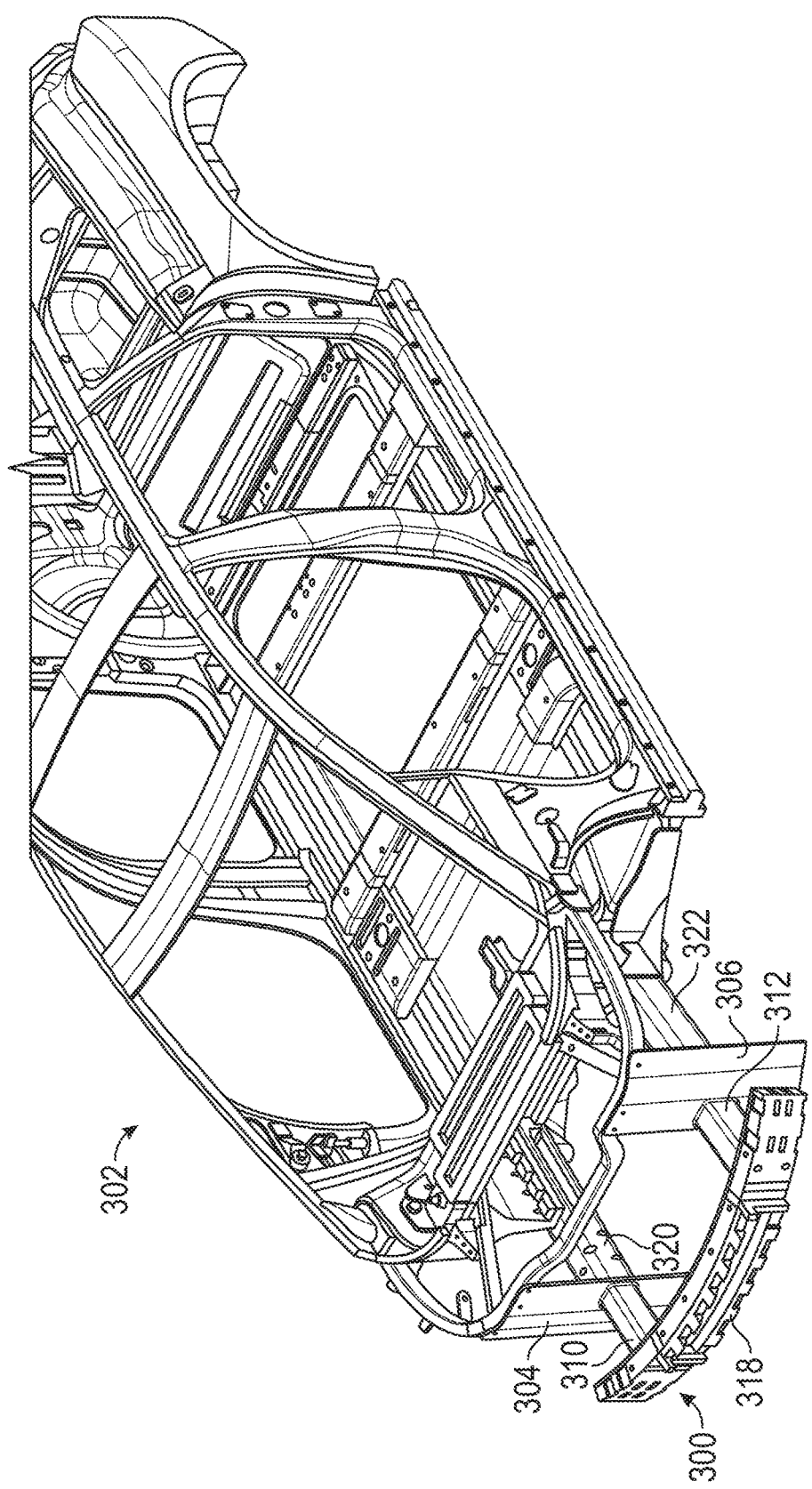
FIG. 14 is a perspective view of another exemplary underbody structure and a portion of a vehicle body according to an exemplary embodiment.
Figure 15:
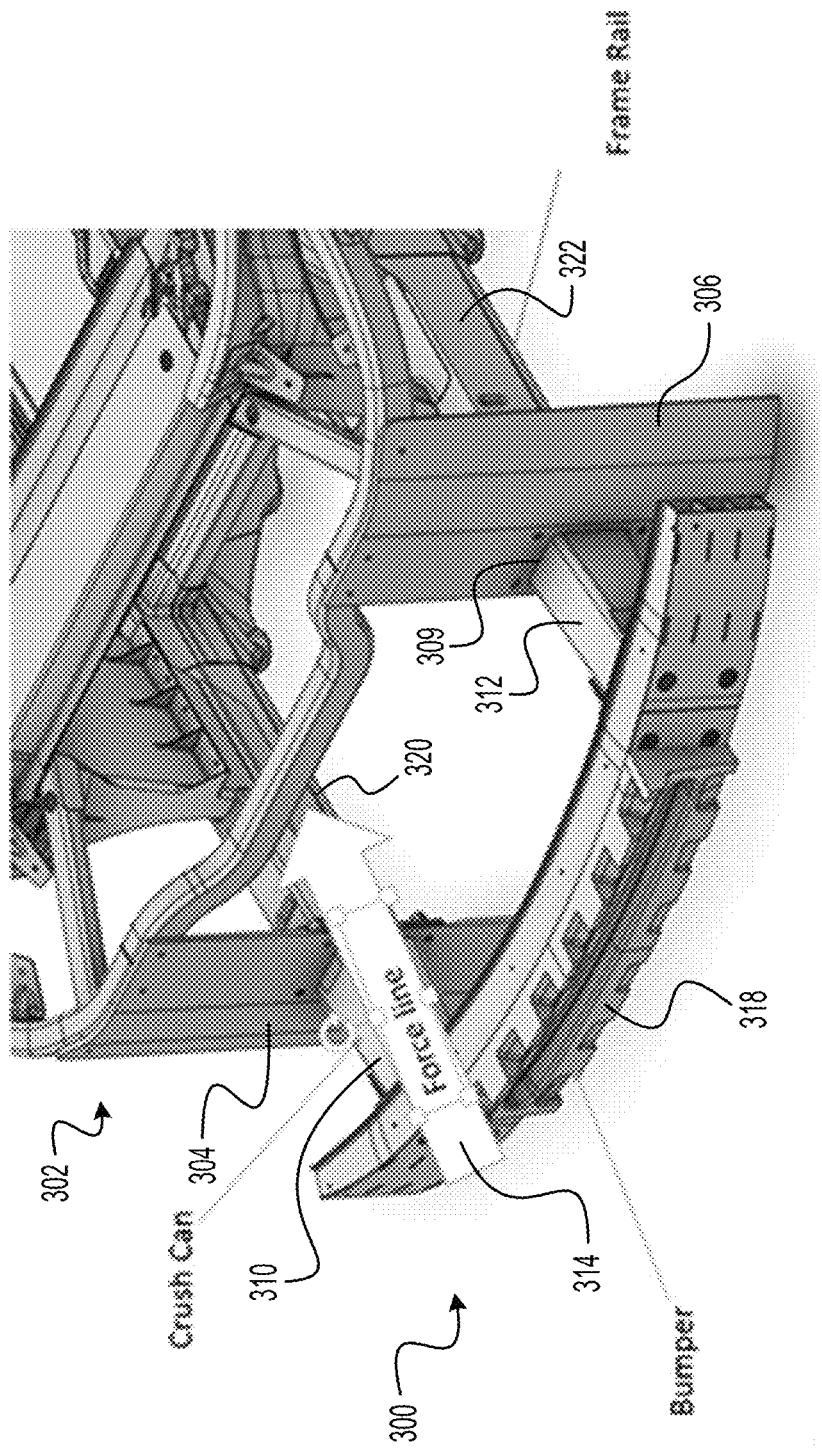
FIG. 15 is a detailed view of the underbody structure illustrating a force line along which collision energy will travel in the event of a head-on collision.

FIGS. 14-15 illustrate another example embodiment of an underbody 300 and a vehicle body 302 having a first front mounting 304 and a second front mounting 306. As shown in FIG. 14, the underbody 300 has a first tapered crush can 310 and a second tapered crush can 312. The tapered crush cans 310, 312 may include at least some of the materials, design, construction, features, operations, etc. as were described for crush cans 124, 126 (FIGS. 3 and 6). For example, the tapered crush cans 310, 312 connect a front bumper 318 with a first frame rail 320 and a second frame rail 322 to provide a crush zone. The tapered crush cans 310, 312 may be constructed from CA28 aluminum, although it is to be understood that other aluminum alloys or materials such as iron, steel or other suitable material may be used. In one embodiment, friction stir welding forms the tapered crush cans 310, 312. However, it is to be understood that other methods are contemplated and may be used to form the tapered crush cans 310, 312 in the present disclosure.

FIG. 15 depicts, in the event of a head-on collision, the force line 314 along which collision energy will travel. The tapered crush cans 310, 312 absorb the collision energy in order to prevent the energy from injuring passengers or damaging sensitive areas of the automobile in the event of a crash. In one embodiment, the tapered crush cans 310, 312 uniformly collapse by buckling and folding in on themselves with little to no cracking or shearing to create a desired collapsing behavior, as will be shown and described in greater detail in FIGS. 27-31. As such, forces from a crash event are directed along a desired path. Furthermore, the tapered crush cans 310, 312 absorb and dissipate a maximum amount of energy possible.

Turning now to FIGS. 16-22 collectively, the tapered crush can 312 includes a body having a first end 330, a second end 332, a top wall 338, a bottom wall 340, a first side wall 342 and a second side wall 344. The first end 330 and the second end 332 have a first edge 334 and a second edge 336 respectively.

Figure 16:
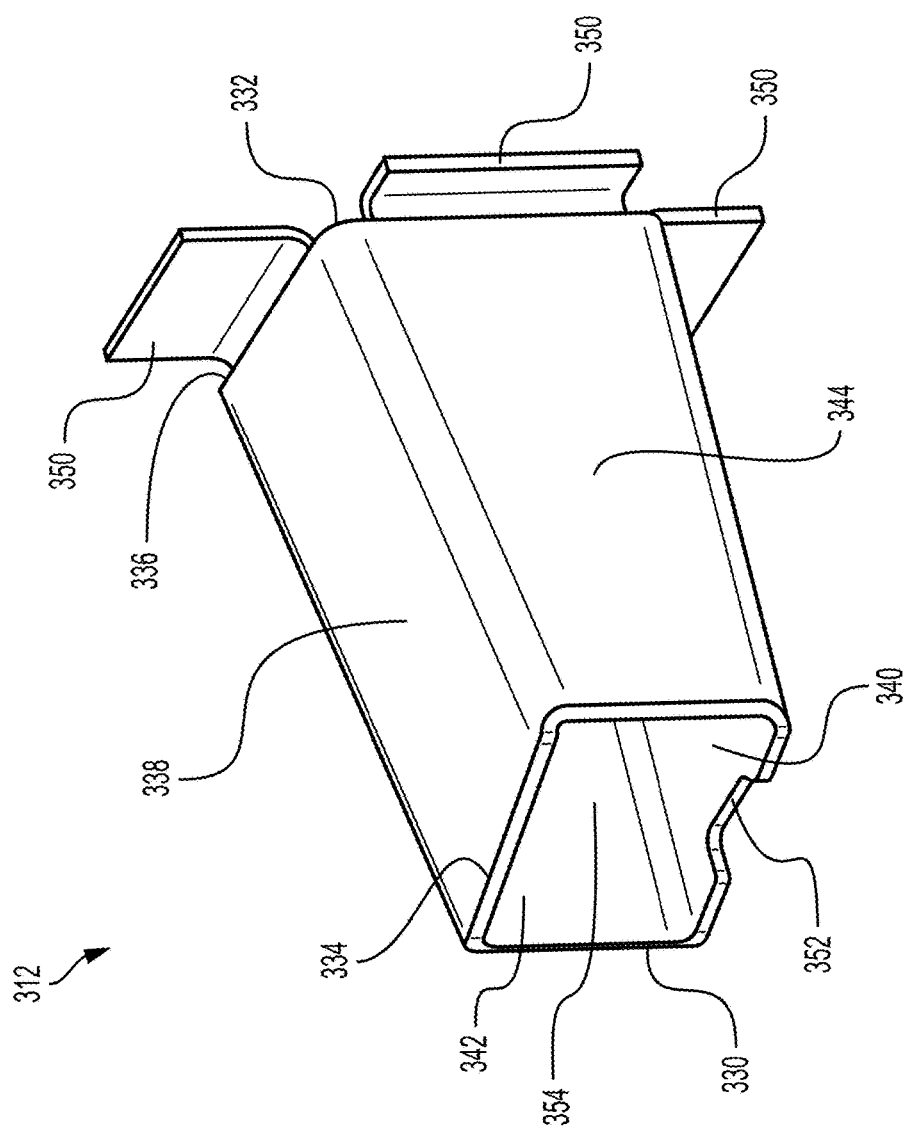
FIG. 16 is a perspective view of a tapered crush can according to an exemplary embodiment.

FIG. 16 illustrates a perspective view of the second tapered crush can 312. The first tapered crush can 310 and the second tapered crush can 312 may be constructed similarly (e.g., as mirror images of each other) to one another and thus the description of the second tapered crush can 312 will similarly apply to the first tapered crush can 310. For brevity and clarity, only the second tapered crush can 312 will be described in detail.

Figure 17:
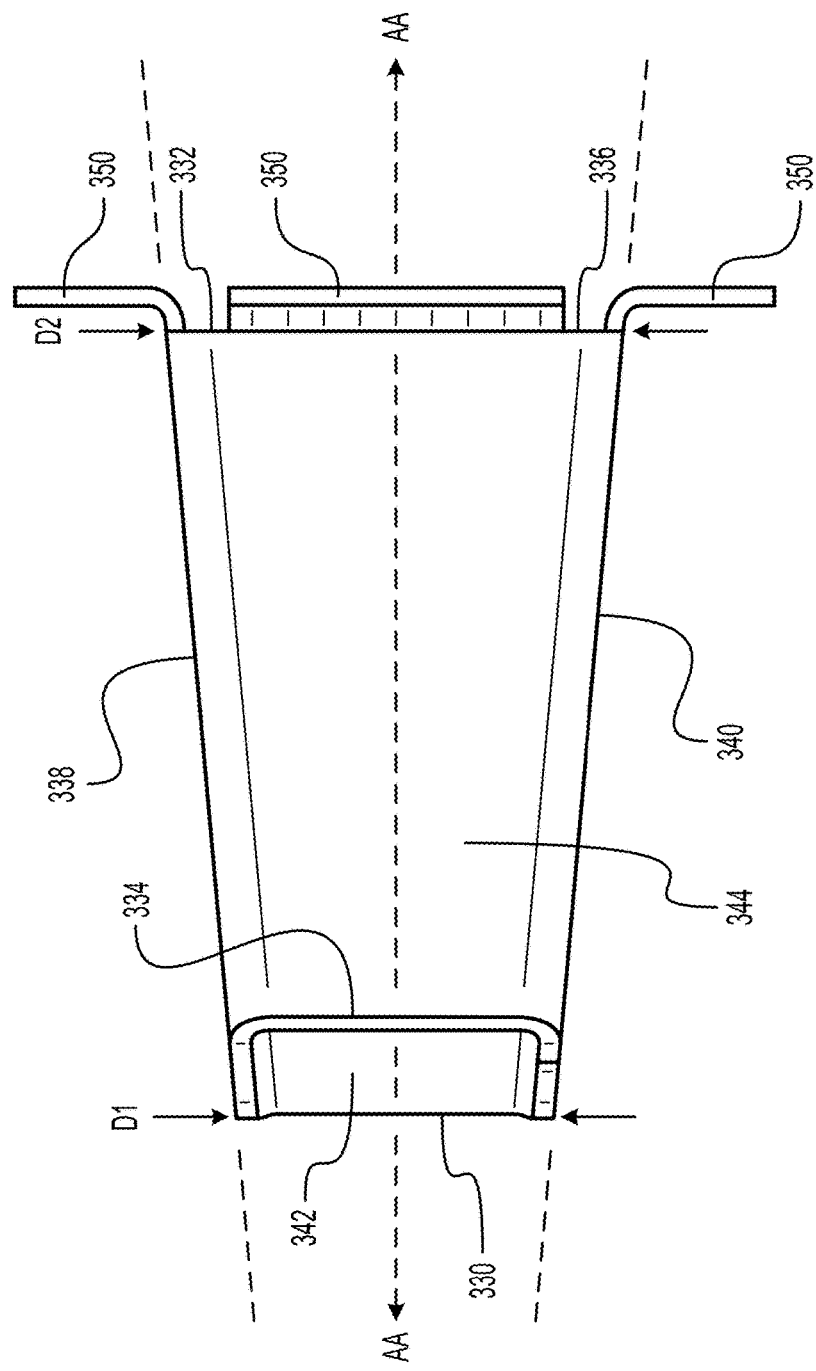
FIG. 17 is a right side view of the tapered crush can.
Figure 18:
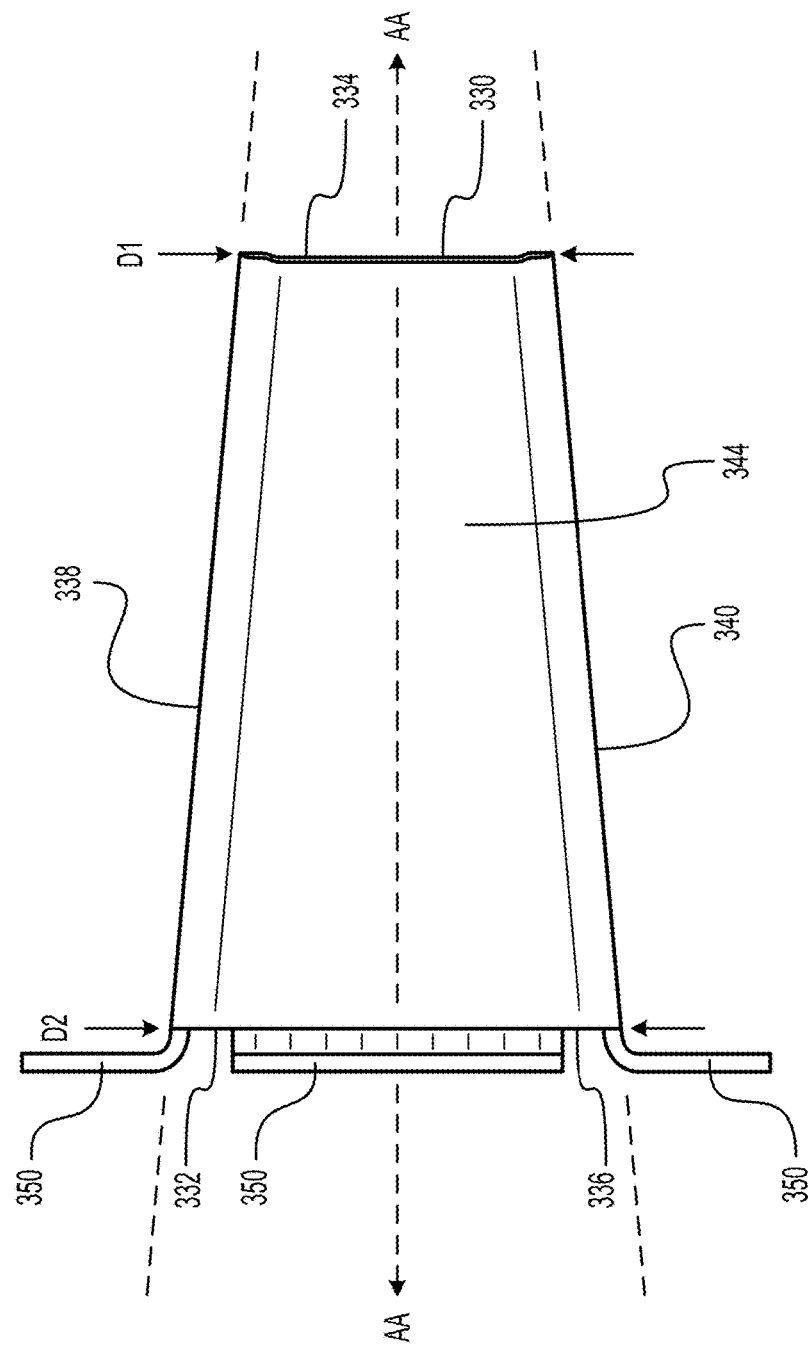
FIG. 18 is a left side view of the tapered crush can.

As shown in the right and left side views depicted in FIGS. 17 and 18 respectively, the top wall 338 and the bottom wall 340 form a tapered structure. A first distance D1 separates the top wall 338 and bottom wall 340 at the first end 330 and a second distance D2 separates the top wall 338 and bottom wall 340 at the second end 332. The top wall 338 and the bottom wall 340 taper inwardly toward one another from the second end 332 to the first end 330. As such, the first distance D1 is less than the second distance D2. In certain embodiments, the second distance D2 is about 124 mm and the first distance D1 is about 82 mm, although it is to be appreciated that the first distance D1 and second distance D2 may be any suitable distance as discussed in the present disclosure.

In one embodiment, the top wall 338 extends above a horizontal axis AA at a first angle of approximately five degrees. The bottom wall 340 may extend below the horizontal axis AA at a second angle of approximately five degrees. In one or more embodiments, the first angle and the second angle are substantially equal. It is to be understood that the top wall 338 and the bottom wall 340 may taper with any suitable range of angles to create the desired collapsing behavior in the event of a collision.

Figure 19:
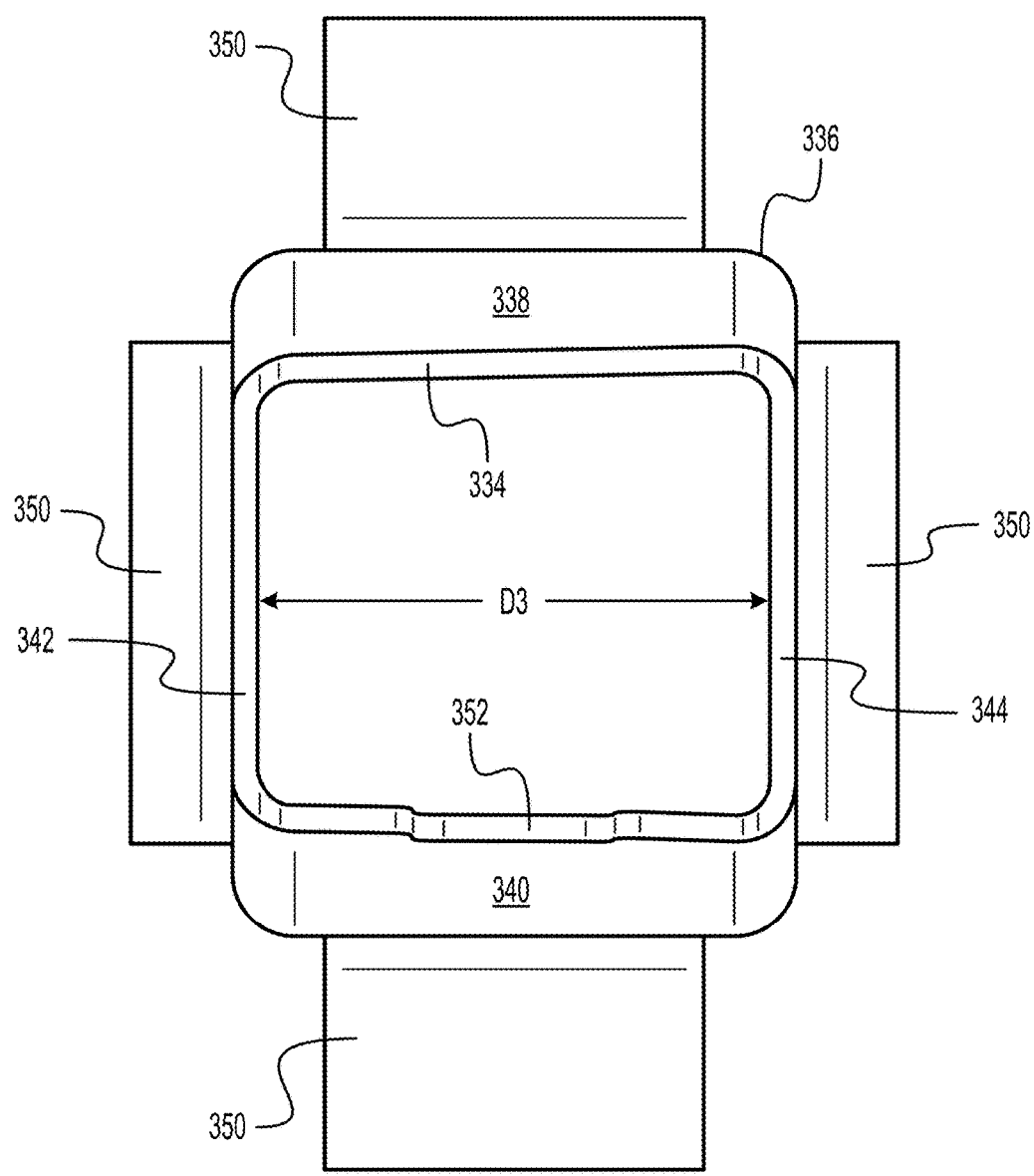
FIG. 19 is a front view of the tapered crush can.
Figure 20:
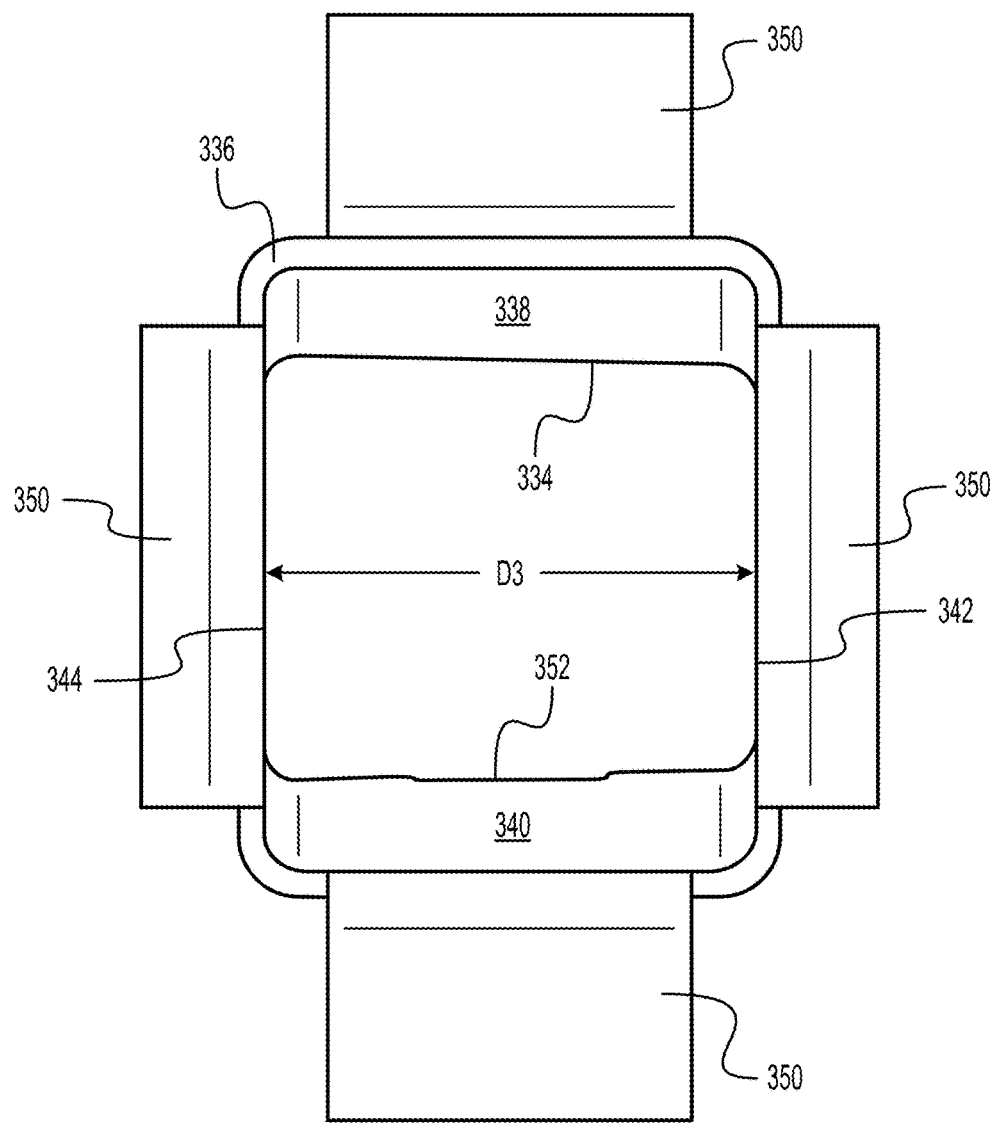
FIG. 20 is a rear view of the tapered crush can.

FIGS. 19 and 20 illustrate front and rear views of the tapered crush can 312 respectively. As shown, the first side wall 342 does not taper with respect to the second side wall 344. Instead, the first side wall 342 and the second side wall 344 are parallel to one another and maintain a separation of a third distance D3 apart. In certain embodiments, the third distance D3 is about 100 mm, although it is to be appreciated that the third distance D3 may be any suitable distance as discussed in the present disclosure.

The top wall 338 and the bottom wall 340 have flat, planar surfaces with a constant thickness and a continuous surface area that extend from the first edge 334 to the second edge 336 of the tapered crush can 312. Similarly, the first and the second side walls 342, 344 also have flat, planar surfaces with a constant thickness and a continuous surface area that extend from the first edge 334 to the second edge 336. In some embodiments, the constant thickness is about 3 mm to about 5 mm.

FIG. 21 shows a top view of the tapered crush can 312. In one embodiment, the first edge 334 is angled relative to the first and the second side walls 342, 344. Since the front bumper 318 can have a substantially arcuate shape, the first edge 334 may be angled in order to lie substantially flush with, or parallel to, an inner surface of the front bumper 318, as will be shown and described in greater detail in FIGS. 22-25. In some embodiments, the first edge 334 is planar as depicted in FIG. 21. However, it is to be understood that the first edge 334 may also be curved or arcuate, or take on other suitable angles in order to mate with the front bumper 318.

Referring back to FIG. 16, the tapered crush can 312 includes an internal cavity 354 open at the first end 330 and the second end 332. The internal cavity 354 is surrounded on four sides by the top wall 338, the bottom wall 340, the first side wall 342 and the second side wall 344. In one or more embodiments, each of the top wall 338, the bottom wall 340, the first side wall 342 and the second side wall 344 contain a substantially constant thickness. As such, the internal cavity 354 may similarly taper along the top wall 338 and the bottom wall 340 as previously described with respect to the tapered crush can 312. In some embodiments, the bottom wall 340 of the tapered crush can 312 includes a recess 352 disposed at the first end 330.

Referring to FIGS. 16-22 collectively, the tapered crush can 312 also has a plurality of outwardly projecting flanges 350 disposed at the second end 332. The flanges 350 extend tangentially to the top wall 338, the bottom wall 340, the first side wall 342 and the second side wall 344 respectively, then curve outwards such that each of the plurality of flanges 350 is coplanar. The plurality of flanges 350 facilitates coupling of the tapered crush can 312 with the frame rail 322 and the front mounting 306, as will be described in greater detail below. Furthermore, while the tapered crush can 312 includes a first, a second, a third and a fourth flange 350, it is to be appreciated that any number of flanges or projections may be used within the present disclosure.

The tapered crush cans 310, 312 do not require an initiator or pre-weakening to create the desired collapsing behavior. Instead, the tapered crush cans 310, 312 comprise a construction having a constant thickness and a plurality of flat, planar surfaces. Furthermore, during compression, the tapered crush cans 310, 312 maintain a continuous, smooth outer surface without sheering or cracking, as will be described in greater detail below.

FIGS. 23-26 illustrate the connection between the tapered crush can 312, the underbody 300 and the vehicle body 302. The tapered crush can 312 is designed so that it may be easily replaced by a service technician if it sustains damage.

Figure 23:
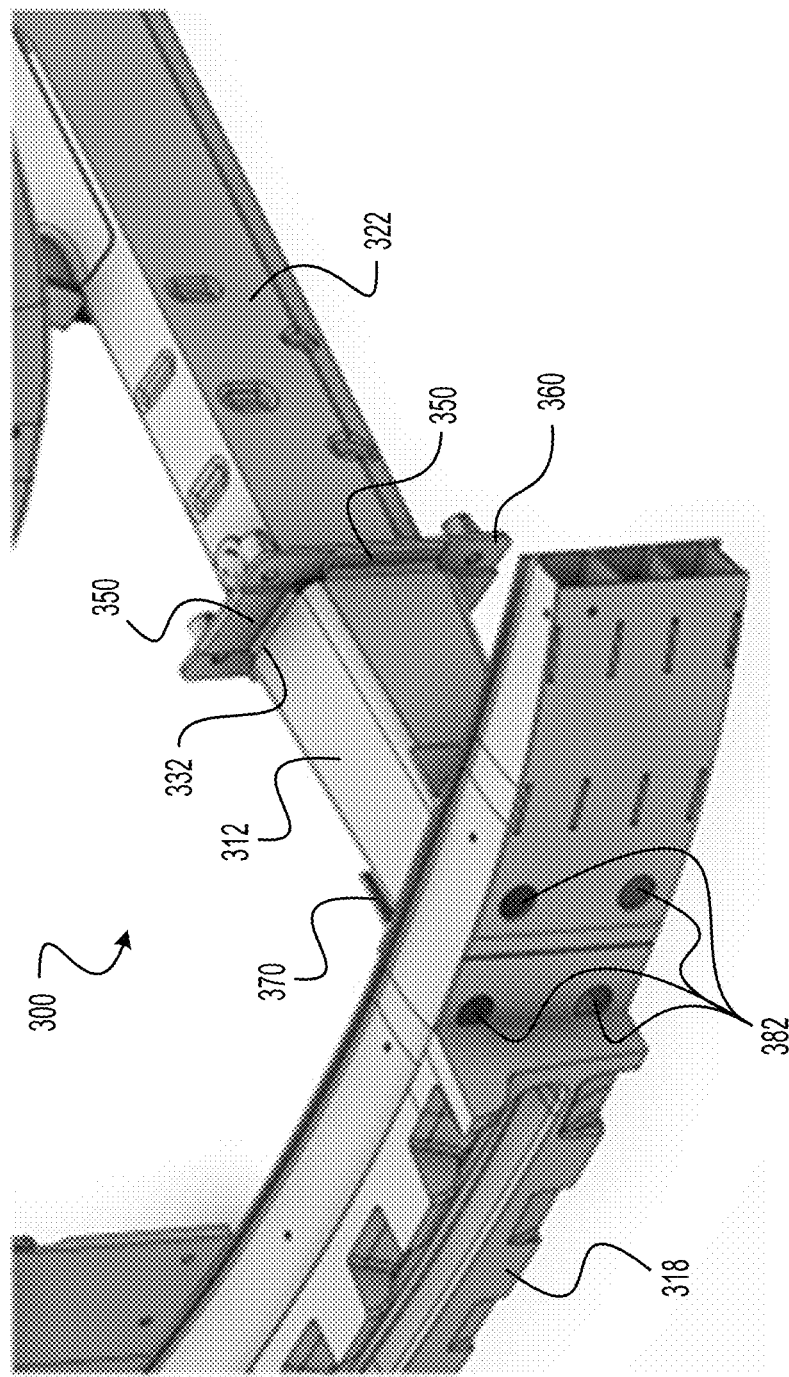
FIG. 23 is a front perspective view of the underbody structure with the tapered crush can attached.

FIG. 23 depicts the front bumper 318 coupled to the first end 330 of the tapered crush can 312 with an intermediary connector 370. In one embodiment, one or more apertures 382 are disposed in the front bumper 318 to facilitate the attachment of the front bumper 318 to the intermediary connector 370, as will be discussed in greater detail below.

Figure 24:
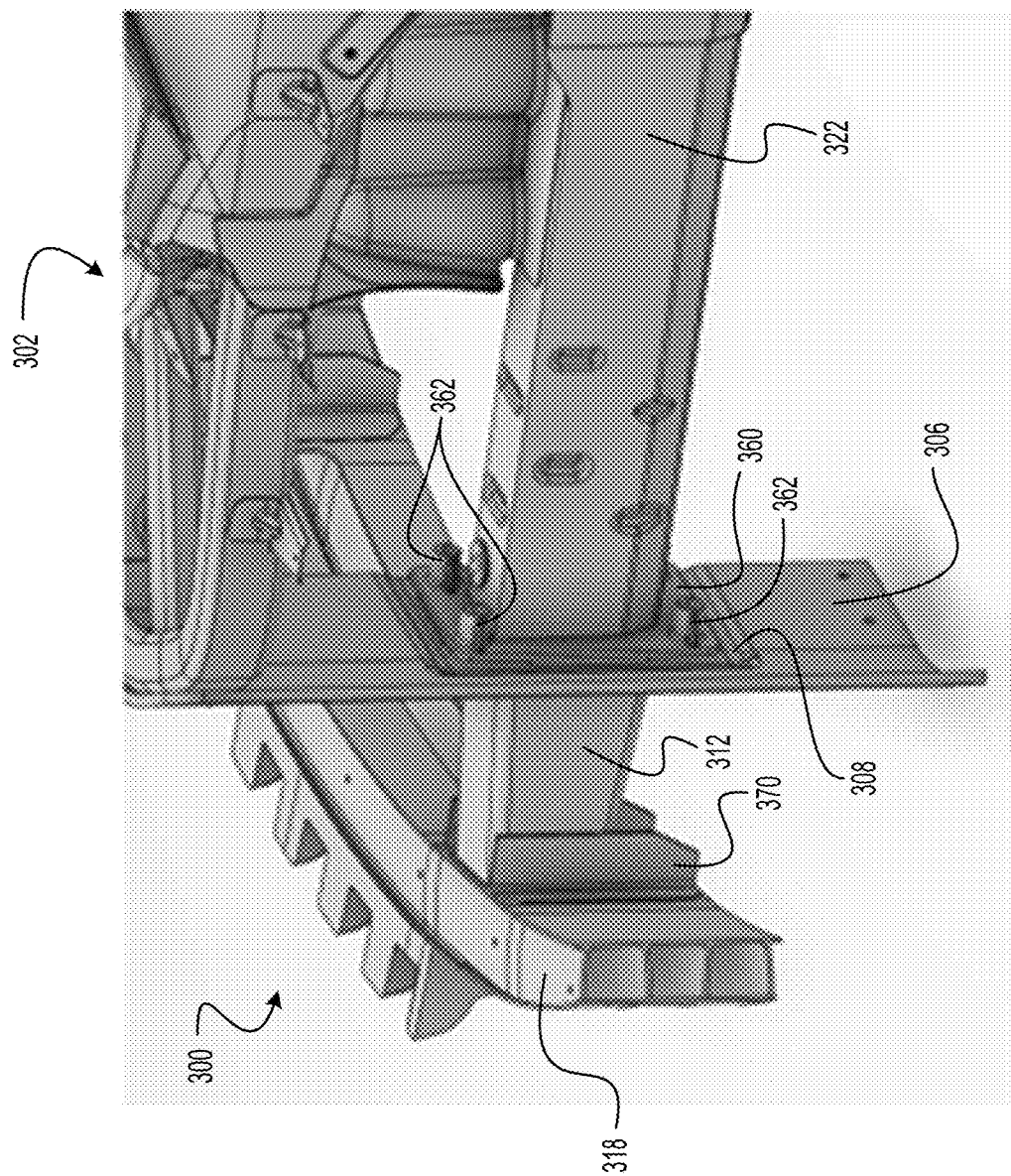
FIG. 24 is a rear perspective view of the vehicle body with the tapered crush can attached.

FIGS. 23-24 further illustrate the frame rail 322 coupled to the second end 332 of the tapered crush can 312. The plurality of flanges 350 of the tapered crush can 312 abut a platform 360 of the frame rail 322. As will be described in greater detail below, the tapered crush can 312 is attached to the frame rail 322 by normal forces that compress the plurality of flanges 350 between the platform 360 and the front mounting 306.

In FIG. 24, fasteners 362 attaches the front mounting 306 to the frame rail 322. Apertures (not shown) disposed in the front mounting 306 and disposed in the platform 360 of the frame rail 322 receive the fasteners 362. Fasteners 362 can be via any number of forms, such as mechanical bolts, pins, screws or other suitable fastener.

Referring to FIGS. 15 and 24, the front mounting 306 includes a hole 309 and a recessed portion 308. The hole 309 receives a portion of the tapered crush can 312 proximate to the second end 332. During installation, the front end 330 is inserted through the hole 309 until the plurality of flanges 350 abut the recessed portion 308 of the front mounting 306. The frame rail 322 is then attached to the front mounting 306 by fasteners 365 as previously described. As such, the plurality of flanges 350 are disposed between the front mounting 306 and the platform 360, which prevents the lateral movement of the tapered crush can 312. All other movement of the tapered crush can 312 is restricted by the hole 309 of the front mounting 306.

Furthermore, a profile of the second end 332 of the tapered crush can 312 is substantially similar to and aligned with a profile of the frame rail 322. As such, in the event of a collision, normal forces exerted between the second end 332 and the frame rail 322 are aligned, which ensures that the tapered crush can 312 collapses uniformly.

Figure 25:
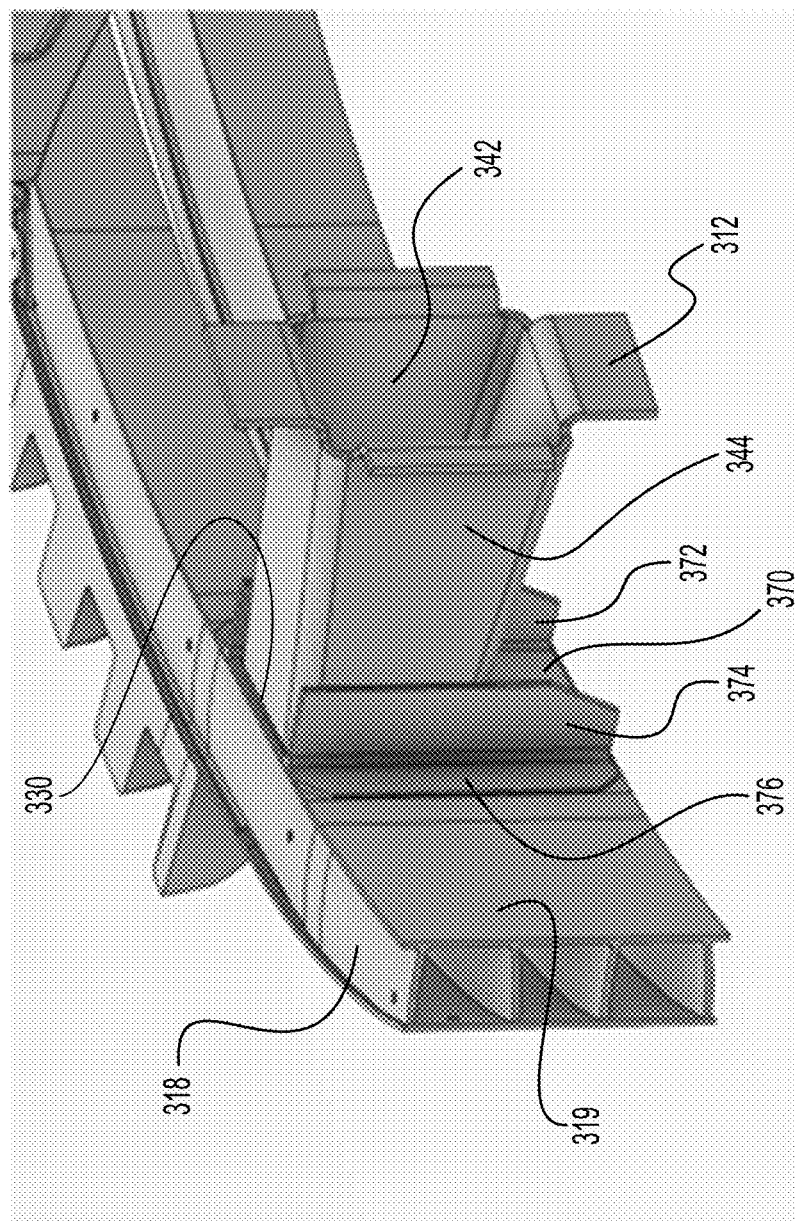
FIG. 25 is a rear perspective view of the tapered crush can attached to a front bumper with an intermediary connector.
Figure 26:
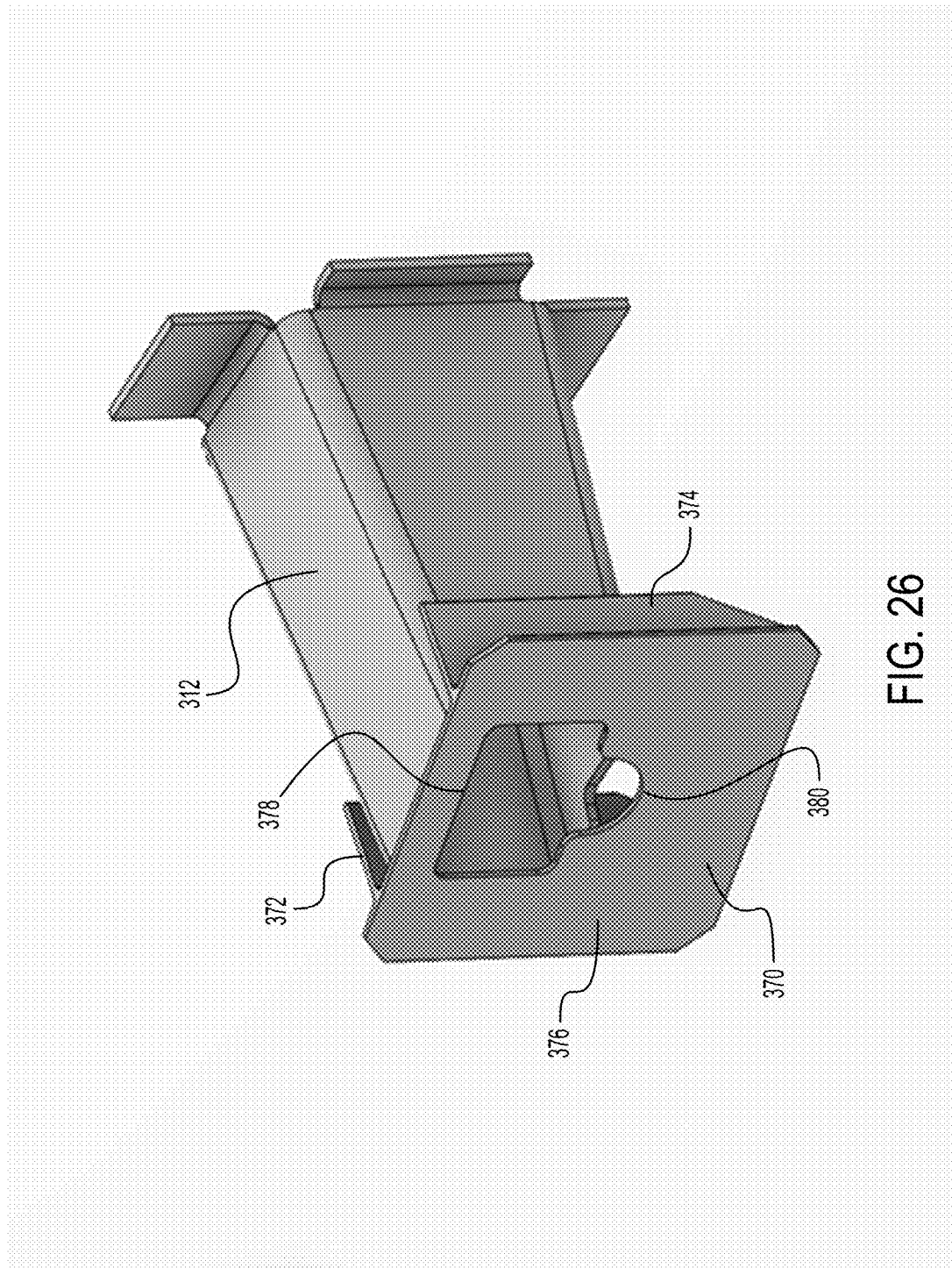
FIG. 26 is a front perspective view of the tapered crush can with the intermediary connector attached.

FIGS. 25-26 illustrates the intermediary connector 370 disposed between the front bumper 318 and the tapered crush can 312. The intermediary connector 370 includes a first projection 372, a second projection 374 and a plate 376. The first projection 372 and the second projection 374 are adjacent to and abut against the first side wall 342 and the second side wall 344 of the tapered crush can 312 respectively. A first surface of the plate 376 abuts against the first end 330 of the tapered crush can 312, and an opposite, second surface of the plate 376 abuts against an inner wall 319 of the front bumper 318. As shown in FIG. 26, the intermediary connector 370 may further include an aperture 378 and an indentation 380. In certain embodiments, the plate 376 is flat and planar. In other embodiments, the plate 376 is slightly curved or arcuate to mate with the slightly curved or arcuate inner wall 319.

In one or more embodiments, tacks (not shown) fasten the first projection 372 and the second projection 374 to the tapered crush can 312. During installation, the intermediary connector 370 is aligned with the tapered crush can 312 as shown. A high speed applicator then accelerates each tack, which penetrates both the intermediary connector 370 and the tapered crush can 312. As such, the intermediary connector 370 and the tapered crush can 312 are joined without the need for pre-punching or other form of aperture. However, it is to be understood that the intermediary connector 370 and the tapered crush can 312 may be joined with other fasteners and methods, such as bolts, screws, pins, clamps, rivets, welding, adhesive, or other suitable fastener.

In some embodiments, tacks (not shown) fasten the plate 376 of the intermediary connector 370 to the inner wall 319 of the front bumper 318. The tacks may operate and be installed with a similar method as described above with respect to the tapered crush can 312. Referring back to FIG. 23, the one or more apertures 382 in the front bumper 318 provide access to the inner wall 319 such that the high speed applicator may reach the inner wall 319 to install the tacks. The tacks then penetrate the inner wall 319 and the plate 376 and fasten the front bumper 318 to the intermediary connector 370.

FIGS. 27-31 illustrate a uniform collapse of an exemplary tapered crush can 312 under compressive forces 400. FIGS. 27-30 show a first stage, a second stage, a third stage and a fourth stage of the uniform collapse respectively. The tapered crush can 312 will begin to uniformly collapse after compressive forces 400 are greater than a predetermined threshold force.

Figure 27:
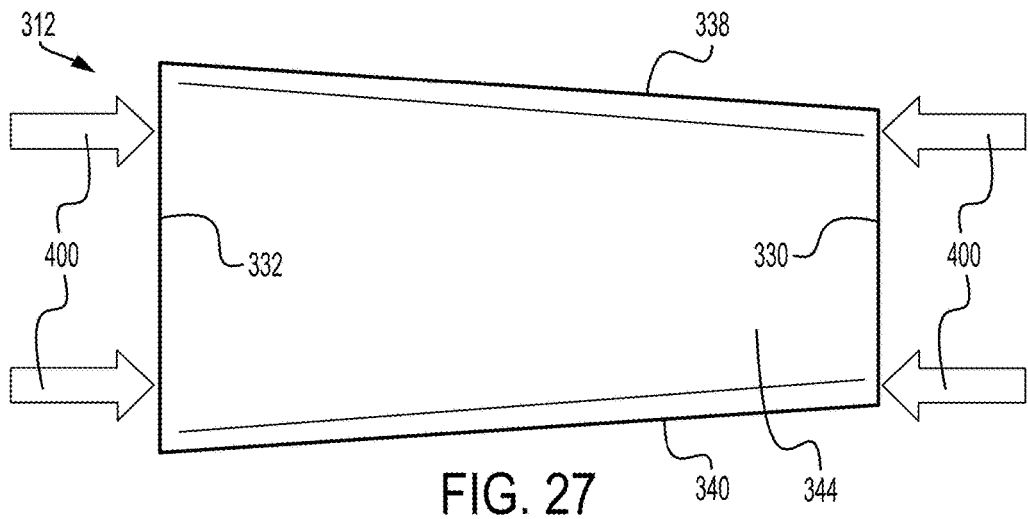
FIG. 27 is a side view of an exemplary tapered crush can under compressive forces at a first stage.

At the first stage, in FIG. 27, the compressive forces 400 begin to exert pressure on the first end 330 and the second end 332 of tapered crush can 312. The top wall 338, the bottom wall 340, the first side wall 342 (not shown) and the second side wall 344 are flat and planar as previously described.

Figure 28:
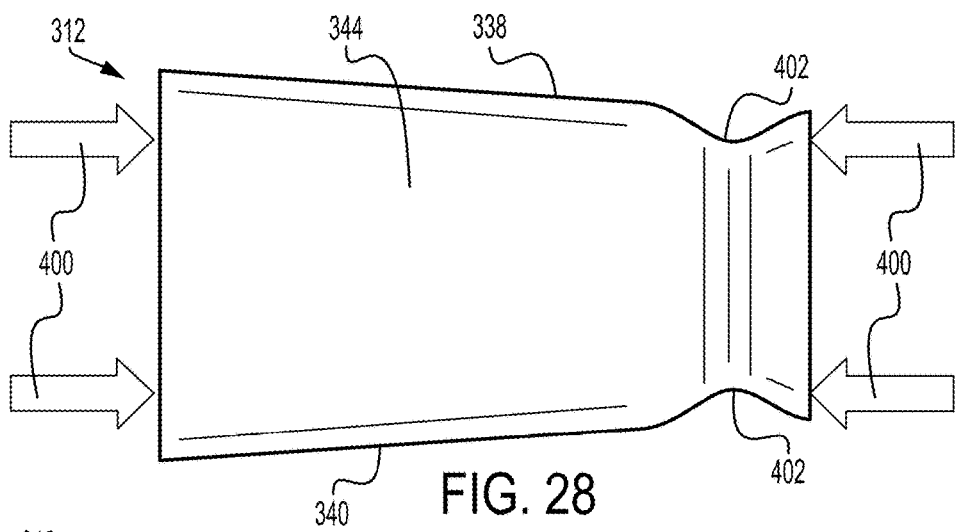
FIG. 28 is a side view of the tapered crush can under compressive forces at a second stage.

At the second stage in FIG. 28, the tapered crush can 312 begins to collapse. The compressive forces 400 bend the walls 338, 340, 342 and 344 at a first inflection point 402. It is to be appreciated that the tapered crush can 312 folds in upon itself at the first inflection point 402 with little to no cracking or shearing. This is due, in part, to the particular shape and thickness of the tapered crush can 312 as previously discussed.

Figure 29:
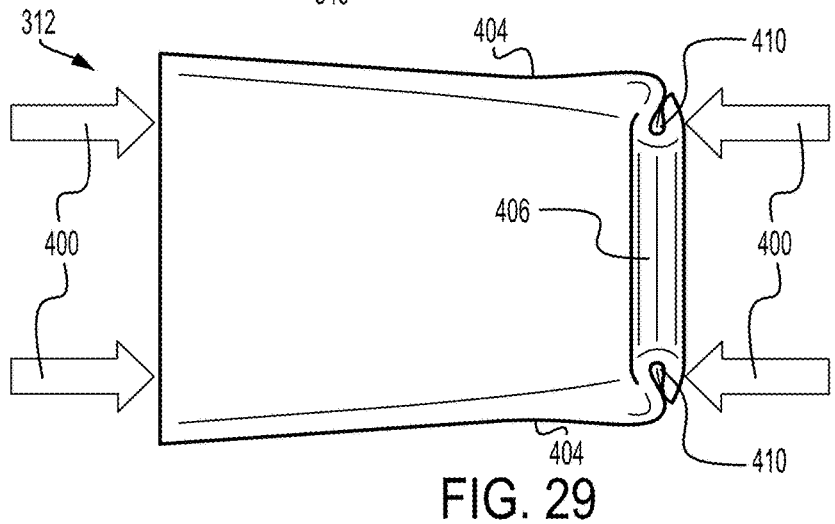
FIG. 29 is a side view of the tapered crush can under compressive forces at a third stage.

At the third stage in FIG. 29, the uniform collapse of the tapered crush can 312 continues as a first fold 406 forms in the first side wall 342 and the second side wall 344 at the first inflection point 402. Similarly, a second fold 410 forms in the top wall 338 and the bottom wall 340. In one or more embodiments, the first fold 406 is a convex fold and the second fold 410 is a concave fold. A second inflection point 404 begins to form as the compressive forces 400 continue to apply pressure to the first end 330 and the second end 332 of the tapered crush can 312. Again, the walls 338, 340, 342 and 344 experience little to no cracking or shearing due to the shape and construction of the tapered crush can 312.

Figure 30:
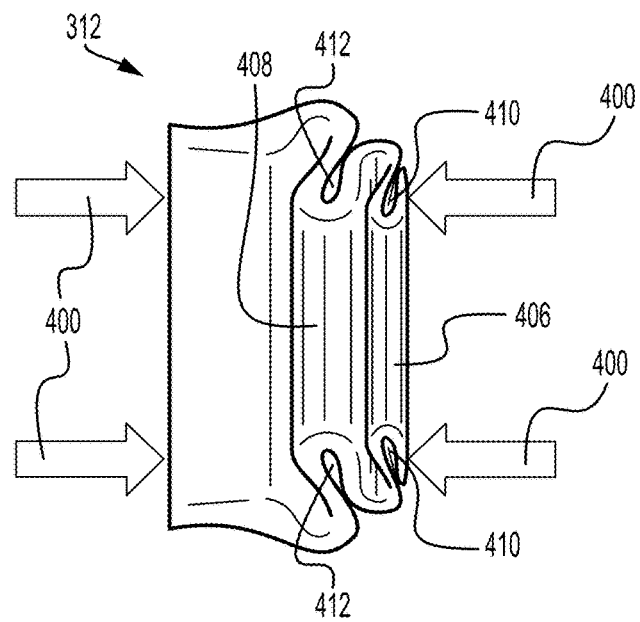
FIG. 30 is a side view of the tapered crush can under compressive forces at a fourth stage.
Figure 31:
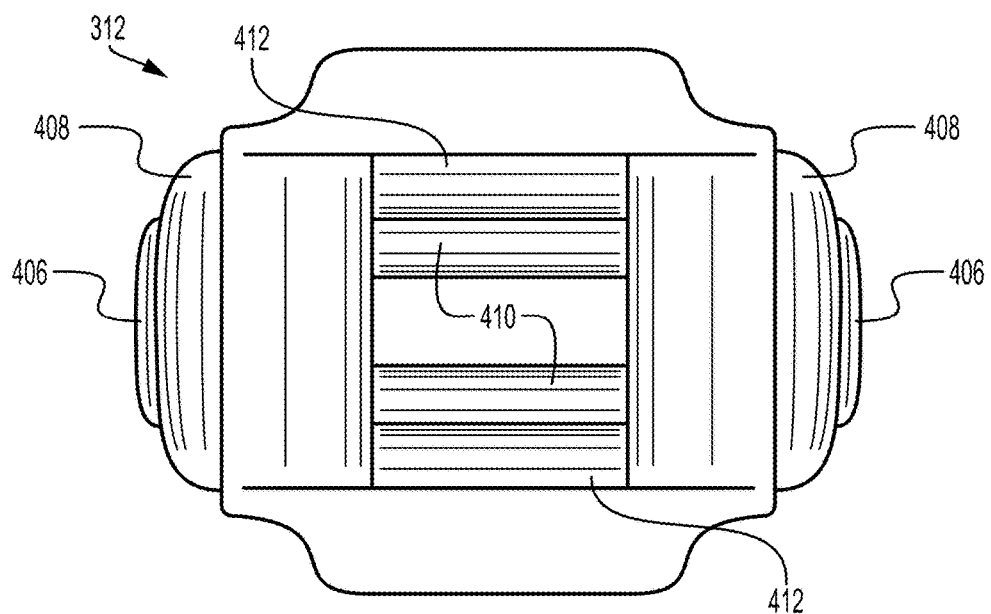
FIG. 31 is a front view of the tapered crush can after undergoing compressive forces.

At the fourth stage in FIGS. 30 and 31, the uniform collapse of the tapered crush can 312 continues as a third fold 408 forms on the first side wall 342 and the second side wall 344 at the second inflection point 404. Similarly, a fourth fold 412 forms on the top wall 338 and the bottom wall 340. In one or more embodiments, the first fold 406 and the third fold 408 form convex folds on the first side wall 342 and the second side wall 344 and the second fold 410 and the fourth fold 412 form concave folds on the top wall 338 and bottom wall 340. As shown in FIGS. 27-31, the tapered crush can 312 comprises a continuous, smooth outer surface at each stage of the uniform collapse.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A crush can for a vehicle underbody comprising:
   a first end and a second end;
   one or more flanges extending from the second end, the one or more flanges each having a turn and a flat portion, the flat portion being orthogonal to the first side wall and the second side wall;
   a top wall and a bottom wall, the top wall and the bottom wall tapering from the second end towards the first end; and
   a first side wall and a second side wall, the top wall, the bottom wall, the first side wall and the second side wall each having a flat surface.

2. The crush can according to claim 1 further comprising a longitudinal axis running from the first end to the second end, wherein the crush can uniformly collapses when under a compression force along the longitudinal axis greater than a predetermined threshold force.

3. The crush can according to claim 2, wherein the top wall, the bottom wall, the first side wall and the second side wall each have one or more folds after the crush can uniformly collapses.

4. The crush can according to claim 3, wherein the one or more folds of the first side wall and the second side wall are convex.

5. The crush can according to claim 3, wherein the one or more folds of the top wall and the bottom wall are concave.

6. The crush can according to claim 2, wherein the top wall, the bottom wall, the first side wall and the second side wall have a continuous outer surface before and after the crush can uniformly collapses.

7. A crush can for a vehicle underbody comprising:
   a body having a first open end, a second open end, an outer surface, and a longitudinal axis running from the first open end to the second open end;
   a first state; and
   a second state after the crush can uniformly collapses when under one or more compressive forces along the longitudinal axis greater than a predetermined threshold force; wherein the outer surface is a smooth, continuous surface in the first state and the second state.

8. The crush can according to claim 7, the body further comprising a top wall, a bottom wall, a first side wall and a second side wall, wherein each wall is flat and planar in the first state.

9. The crush can according to claim 8, wherein the top wall and the bottom wall taper from the second open end towards the first open end.

10. The crush can according to claim 8, wherein the top wall and the bottom wall are separated by a first distance at the first open end and by a second distance at the second open end, wherein the first distance is less than the second distance.

11. The crush can according to claim 10, wherein the first side wall and the second side wall are substantially parallel and are separated by a third distance.

12. The crush can according to claim 8, wherein the top wall, the bottom wall, the first side wall and the second side wall each have one or more folds in the second state.

13. A motor vehicle underbody comprising:
    a front bumper;
    at least one frame rail;
    at least one crush can coupled to the front bumper and the at least one frame rail, the crush can comprising:
      a first end, a second end, and a longitudinal axis running from the first end to the second end;
      a top wall and a bottom wall, the top wall and the bottom wall tapering from the second end towards the first end; and
      a first side wall and a second side wall, the top wall, the bottom wall, the first side wall and the second side wall each having a flat surface,
      wherein the crush can uniformly collapses when compressed by one or more forces along the longitudinal axis; and
    an intermediary connector disposed between the front bumper and the at least one crush can.

14. The motor vehicle underbody according to claim 13, the at least one crush can further comprising a plurality of flanges extending between the at least one frame rail and a front mounting of a vehicle body.

15. The motor vehicle underbody according to claim 13, wherein after the at least one crush can uniformly collapses, the top wall and the bottom wall each have one or more concave folds and the first side wall and the second side wall each have one or more convex folds.

16. The motor vehicle underbody according to claim 13, wherein the body of the at least one crush can has a continuous, smooth outer surface.

17. A motor vehicle underbody comprising:
    a front bumper;
    at least one frame rail; and
    at least one crush can coupled to the front bumper and the at least one frame rail, the crush can comprising:
      a first end, a second end, and a longitudinal axis running from the first end to the second end;
      a top wall and a bottom wall, the top wall and the bottom wall tapering from the second end towards the first end; and
      a first side wall and a second side wall, the top wall, the bottom wall, the first side wall and the second side wall each having a flat surface,
      wherein the crush can uniformly collapses when compressed by one or more forces along the longitudinal axis, wherein the body of the at least one crush can has a continuous, smooth outer surface.

18. The motor vehicle underbody according to claim 17, further comprising an intermediary connector disposed between the front bumper and the at least one crush can.

19. The motor vehicle underbody according to claim 17, the at least one crush can further comprising a plurality of flanges extending between the at least one frame rail and a front mounting of a vehicle body.

20. The motor vehicle underbody according to claim 17, wherein after the at least one crush can uniformly collapses, the top wall and the bottom wall each have one or more concave folds and the first side wall and the second side wall each have one or more convex folds.

* * * * *